US006038539A

United States Patent [19]

Maruyama et al.

[11] Patent Number: 6,038,539

[45] Date of Patent: Mar. 14, 2000

[54] JOB SCHEDULING SYSTEM FOR DESIGNATING PROCEDURE START TIMES

[75] Inventors: Fumihiro Maruyama; Yoriko Minoda; Shuho Sawada; Yuka Takizawa, all of Kawasaki, Japan

[73] Assignee: Fujitsu Limited, Kawasaki, Japan

[21] Appl. No.: 08/026,014

[22] Filed: Mar. 4, 1993

[30] Foreign Application Priority Data

Mar. 4, 1992 [JP] Japan .................................. 4-046895

[51] Int. Cl.[7] ...................................................... G06F 17/60

[52] U.S. Cl. .................. 705/8; 364/468.07; 364/468.06; 705/7

[58] Field of Search .................................... 364/401, 402, 364/403, 468, 468.05, 468.06, 468.07; 395/207, 208, 209; 705/7, 8, 9

[56] References Cited

U.S. PATENT DOCUMENTS

| | | | |
|---|---|---|---|
| 4,642,758 | 2/1987 | Teng | 395/600 |
| 4,852,001 | 7/1989 | Tsushima et al. | 364/401 |
| 4,896,269 | 1/1990 | Tong | 364/468 |
| 5,006,992 | 4/1991 | Skeirik | 395/68 |
| 5,016,170 | 5/1991 | Pollalis et al. | 364/401 |
| 5,053,970 | 10/1991 | Kurihara et al. | 364/468 |
| 5,070,453 | 12/1991 | Duffany | 364/402 |
| 5,093,794 | 3/1992 | Howie et al. | 364/468 |
| 5,111,391 | 5/1992 | Fields et al. | 395/209 |
| 5,212,791 | 5/1993 | Damian et al. | 395/650 |
| 5,255,181 | 10/1993 | Chapman et al. | 364/401 R |
| 5,280,425 | 1/1994 | Hogge | 364/402 |
| 5,369,570 | 11/1994 | Parad | 364/401 |
| 5,511,218 | 4/1996 | Castelaz | 395/800 |
| 5,568,381 | 10/1996 | Hara et al. | 395/207 |

*Primary Examiner*—David R. Hudspeth
*Assistant Examiner*—Joseph Thomas
*Attorney, Agent, or Firm*—Staas & Halsey

[57] ABSTRACT

A computer-implemented scheduling system and method designates start times of a plurality of procedures processed by a plurality of resource devices. The computer-implemented scheduling system includes an initial restriction violating condition set device for initially setting restriction violating conditions which satisfy a sufficient condition for a violation of the restriction conditions, a start time change device for changing a first start time of one of the procedures, when the restriction violating condition is set by the initial restriction violating condition set device, not to satisfy the restriction violating conditions, a start time designation device for designating a second start time of one of the procedures, when the restriction violating condition is set by the initial restriction violating condition set device, not to satisfy the restriction violating conditions, a restriction violating condition generation device for substituting the first or second start time of one of the procedures, when the start time change device changes the first start time or the start time designation device designates the second start time, respectively, to satisfy the restriction violating conditions, into a variable of the one restriction violating condition and for ANDing the restriction violating conditions with the one restriction violating condition having the substituted first or second start time, to generate a new restriction violating condition, and a restriction violating condition storage device for storing the restriction violating conditions set by the initial restriction violating condition set device and generated by the restriction violating condition generation device.

16 Claims, 30 Drawing Sheets

Fig. 5A

[PROBLEM 1] OBTAINING AN OPTIMUM SCHEDULE (MINIMUM TOTAL PROCESS TIME PERIOD FROM A JOB SHOP SCHEDULING PROBLEM WITH RESPECT TO THREE JOBS AND TWO MACHINES).

| JOB \ PROCEDURE | 1 | 2 |
|---|---|---|
| 1 | 1 | 2 |
| 2 | 2 | 1 |
| 3 | 1 | 2 |

MACHINE FOR USE

| JOB \ PROCEDURE | 1 | 2 |
|---|---|---|
| 1 | 6 | 4 |
| 2 | 4 | 3 |
| 3 | 2 | 5 |

PROCESS TIME

Fig. 5B

[1] INITIAL RESTRICTION VIOLATING CONDITIONS (a) INITIAL RESTRICTION VIOLATING CONDITIONS WITH RESPECT TO AVAILABLE START TIMES:

$x_{111} < 0$ $\quad x_{212} < 0$ $\quad x_{311} < 0$ $x_{122} < 6$ $\quad x_{221} < 4$ $\quad x_{322} < 2$ (b) INITIAL RESTRICTION VIOLATING CONDITIONS WITH RESPECT TO END TIMES:

$x_{111} + 10 > E$ $\quad x_{212} + 7 > E$ $\quad x_{311} + 7 > E$ $x_{122} + 4 > E$ $\quad x_{221} \div 3 > E$ $\quad x_{322} + 5 > E$ (c) INITIAL RESTRICTION VIOLATING CONDITIONS WITH RESPECT TO SEQUENCE OF PROCEDURES:

$x_{111} + 6 > x_{122}$ $\quad x_{212} + 4 > x_{221}$ $\quad x_{311} + 2 > x_{322}$ (d) INITIAL RESTRICTION VIOLATING CONDITIONS WITH RESPECT TO PROHIBITION OF SIMULTANEOUS EXECUTIONS OF MULTIPLE PROCESSES BY THE SAME MACHINE:

$x_{111} + 6 > x_{221} \wedge x_{221} + 3 > x_{111}$ $x_{111} + 6 > x_{311} \wedge x_{311} + 2 > x_{111}$ $x_{221} + 3 > x_{311} \wedge x_{311} + 2 > x_{221}$ $x_{122} + 4 > x_{212} \wedge x_{212} + 4 > x_{122}$ $x_{122} + 4 > x_{322} \wedge x_{322} + 5 > x_{122}$ $x_{212} + 4 > x_{322} \wedge x_{322} + 5 > x_{212}$

[2] Trace of scheduling

Start initial schedule (1) with E = 14.

(1) $x_{322} + 5 > E$ is satisfied.

When $x_{322} = 0$ to 1, $x_{332} < 2$ is satisfied.

When $x_{322} = 2$ to 7, $x_{311} + 2 > x_{322}$ is satisfied.

By substituting $x_{322} = 2$ to 7 into $x_{311} + 2 > x_{322}$ and ANDing them, $x_{311} > 5$ is obtained.

When $x_{322} = 8$ to 9, $x_{122} + 4 > x_{322}$ AND $x_{322} + 5 > x_{122}$ is satisfied.

By substituting $x_{322} = 8$ to 9 into $x_{122} + 4 > x_{322}$ AND $x_{322} + 5 > x_{122}$ and ANDing them, $x_{122} > 5$ AND $x_{122} < 13$ is obtained.

When $x_{322} = 10$ or more, $x_{322} + 5 > E$ is satisfied.

By substituting $x_{322} = 10$ or more into $x_{322} + 5 > E$, $x_{322} + 5 > E$ is obtained.

Thus, NJ is <u>$15 > E$ AND $x_{311} > 5$ AND $x_{122} > 5$ AND $x_{122} < 13$</u>.

Fig. 6A (2) When $x_{122}$ = 0 to 5, $x_{122} < 6$ is satisfied.
When $x_{122}$ = 6 to 12,
$15 > E$ AND $x_{311} > 5$ AND $x_{122} > 5$ AND $x_{122} < 13$ is satisfied.
By substituting $x_{122}$ = 6 to 12 into $15 > E$ AND $x_{311} > 5$ AND $x_{122} > 5$ AND $x_{122} < 13$ and ANDing them, $15 > E$ AND $x_{311} > 5$ is obtained.
When $x_{122}$ = 13 or more,
$x_{122} + 4 > E$ is satisfied.
By substituting $x_{122}$ = 13 or more into $x_{122} + 4 > E$ and ANDing them, $17 > E$ is obtained.
Thus, NJ is $\underline{15 > E \text{ AND } x_{311} > 5}$.

(3) When $x_{311}$ = 0 to 5,
$x_{111} + 6 > x_{311}$ AND $x_{311} + 2 > x_{111}$ is satisfied.
By substituting $x_{311}$ = 0 to 5 into $x_{111} + 6 > x_{311}$ AND $x_{311} + 2 > x_{111}$ and ANDing them,
$x_{111} > -1$ AND $x_{111} < 2$ is obtained.
When $x_{311}$ = 6 or more,
$15 > E$ AND $x_{311} > 5$ is satisfied.
By substituting $x_{311}$ = 6 or more into $15 > E$ AND $x_{311} > 5$ and ANDing them, $15 > E$ is obtained.
Thus, NJ is $\underline{15 > E \text{ AND } x_{111} > -1 \text{ AND } x_{111} < 2}$.

(4) Designate $x_{111} = 2$.

(5) Designate $x_{311} = 0$.

(6) Designate $x_{122} = 8$.

Fig. 6B (7) When $x_{322}$ = 0 to 1, $x_{322} < 2$ is satisfied.

When $x_{322}$ = 2 to 3, $x_{212} + 4 > x_{322}$ AND $x_{322} + 5 > x_{212}$ is satisfied.

By substituting $x_{322}$ = 2 to 3 into $x_{212} + 4 > x_{322}$ AND $x_{322} + 5 > x_{212}$ and ANDing them, $x_{212} > -1$ AND $x_{212} < 7$ is obtained.

When $x_{322}$ = 4 to 11, $x_{122} + 4 > x_{322}$ AND $x_{322} + 5 > x_{122}$ is satisfied.

By substituting $_{322}$ = 4 to 11 into $x_{122} + 4 > x_{322}$ AND $x_{322} + 5 > x_{122}$ and ANDing them, $x_{122} > 7$ AND $x_{122} < 9$ is obtained.

When $x_{322}$ = 12 or more, $x_{322} + 5 > E$ is satisfied.

By substituting $x_{322}$ = 12 or more into $x_{322} + 5 > E$ and ANDing them, $17 > E$ is obtained.

Thus, NJ is $\underline{17 > E \text{ AND } X_{212} > -1 \text{ AND } x_{212} < 7 \text{ AND } x_{122} > 7 \text{ AND } x_{122} < 9}$.

Fig. 6C (8) Designate $x_{122} = 9$.

(9) Designate $x_{322} = 4$.

Thus, the schedule (2) is obtained.

Designate E = 12.

(10) $x_{122} + 4 > E$ is satisfied.

When $x_{122} = 0$ to 5, $x_{122} < 6$ is satisfied.

When $x_{122} = 6$ to 7, $x_{111} + 6 > x_{122}$ is satisfied.

By substituting $x_{122} = 6$ to 7 into $x_{111} + 6 > x_{122}$ and ANDing them, $x_{111} > 1$ is obtained.

When $x_{122} = 8$, 17 > E AND $x_{212} > -1$ AND $x_{212} < 7$ AND $x_{122} > 7$ AND $x_{122} < 9$ is satisfied.

When $x_{122} = 9$ or more, $x_{122} + 4 > E$ is satisfied.

By substituting $x_{122} = 9$ or more into $x_{122} + 4 > E$ and ANDing them, 13 > E is obtained.

Thus, NJ is $\underline{13 > E \text{ AND } x_{111} > 1 \text{ AND } x_{212} > -1 \text{ AND } x_{212} < 7}$.

Fig. 7A

(11) When $x_{111}$ = 0 to 1,

15 > E AND $x_{111}$ > -1 AND $x_{111}$ < 2 is satisfied.

By substituting $x_{111}$ = 0 to 1 into 15 > E AND $x_{111}$ > -1 AND $x_{111}$ < 2 and ANDing them, 15 > E is obtained.

When $x_{111}$ = 2 or more,

13 > E AND $x_{111}$ > 1 AND $x_{212}$ > -1 AND $x_{212}$ < 7 is satisfied.

By substituting $x_{111}$ = 2 or more into 13 > E AND $x_{111}$ > 1 AND $x_{212}$ > -1 AND $x_{212}$ < 7 and ANDing them, 13 > E AND $x_{212}$ > -1 AND $x_{212}$ < 7 is obtained.

Thus, NJ is <u>13 > E AND $x_{212}$ > -1 AND $x_{212}$ < 7</u>.

(12) When $x_{212}$ = 0 to 6,

13 > E AND $x_{212}$ > -1 AND $x_{212}$ < 7 is satisfied.

By substituting $x_{212}$ = 0 to 6 into 13 > E AND $x_{212}$ > -1 AND $x_{212}$ < 7 and ANDing them, 13 > E is obtained.

When $x_{212}$ = 7 or more, $x_{212}$ + 7 > E is satisfied.

By substituting $x_{212}$ = 7 or more into $x_{212}$ + 7 > E and ANDing them, 14 > E is obtained.

Thus, the final NJ is <u>13 > E</u>.

Thus, (2) is an optimum schedule.

[PROBLEM 2] OBTAINING AN OPTIMUM SCHEDULE (MINIMUM TOTAL PROCESS TIME PERIOD FROM A JOB SHOP SCHEDULING PROBLEM WITH RESPECT TO FOUR JOBS AND THREE MACHINES).

| JOB \ PROCEDURE | 1 | 2 | 3 |
|---|---|---|---|
| 1 | 1 | 2 | 3 |
| 2 | 3 | 1 | 2 |
| 3 | 1 | 3 | 2 |
| 4 | 2 | 3 | 1 |

MACHINE FOR USE

| JOB \ PROCEDURE | 1 | 2 | 3 |
|---|---|---|---|
| 1 | 5 | 8 | 2 |
| 2 | 7 | 3 | 9 |
| 3 | 1 | 7 | 10 |
| 4 | 4 | 11 | 7 |

PROCESS TIME

Fig. 9B

[1] INITIAL RESTRICTION VIOLATING CONDITIONS (a) INITIAL RESTRICTION VIOLATING CONDITIONS WITH RESPECT TO AVAILABLE START TIMES:

$x_{111} < 0$ $x_{213} < 0$ $x_{311} < 0$ $x_{412} < 0$ $x_{122} < 5$ $x_{221} < 7$ $x_{323} < 1$ $x_{423} < 4$ $x_{122} < 13$ $x_{232} < 10$ $x_{332} < 8$ $x_{431} < 15$ (b) INITIAL RESTRICTION VIOLATING CONDITIONS WITH RESPECT TO END TIMES:

$x_{111} + 15 > E$ $x_{213} + 19 > E$ $x_{311} + 18 > E$ $x_{412} + 22 > E$ $x_{122} + 10 > E$ $x_{221} + 12 > E$ $x_{323} + 17 > E$ $x_{423} + 18 > E$ $x_{133} + 2 > E$ $x_{232} + 9 > E$ $x_{332} + 10 > E$ $x_{431} + 7 > E$ (c) INITIAL RESTRICTION VIOLATING CONDITIONS WITH RESPECT TO SEQUENCE OF PROCEDURES:

$x_{111} + 5 > x_{122}$ $x_{122} + 8 > x_{133}$ $x_{213} + 7 > x_{221}$ $x_{221} + 3 > x_{232}$ $x_{311} + 1 > x_{323}$ $x_{323} + 7 > x_{332}$ $x_{412} + 4 > x_{423}$ $x_{423} + 11 > x_{431}$ (d) INITIAL RESTRICTION VIOLATING CONDITIONS WITH RESPECT TO PROHIBITION OF SIMULTANEOUS EXECUTIONS OF MULTIPLE PROCESSES BY THE SAME MACHINE:

$x_i + I_i > x_j \wedge x_j + I_j > x_i$

[2] Trace of scheduling

Start initial schedule (1) with E = 42.

(1) $x_{323} + 5 > E$ is satisfied.

(Although $x_{332} + 10 > E$ is also satisfied, $x_{323}$ has the precedence over $x_{332}$.)

When $x_{323} = 0$, $x_{323} < 1$ is satisfied.

When $x_{323} = 1$ to 5, $x_{311} + 1 > x_{323}$ is satisfied.

By substituting $x_{323} = 1$ to 5 into $x_{311} + 1 > x_{323}$ and ANDing them, $x_{311} > 4$ is obtained.

When $x_{323} = 6$, $x_{213} + 7 > x_{323}$ AND $x_{323} + 7 > x_{213}$ is satisfied.

When $x_{323} = 7$ to 14, $x_{133} + 2 > x_{323}$ AND $x_{323} + 7 > x_{133}$ is satisfied.

By substituting $x_{323} = 7$ to 14 into $x_{133} + 2 > x_{323}$ AND $x_{323} + 7 > x_{133}$ and ANDing them, $x_{133} > 12$ AND $x_{133} < 14$ is obtained.

When $x_{323} = 15$ to 25, $x_{423} + 11 > x_{323}$ AND $x_{323} + 7 > x_{423}$ is satisfied.

By substituting $x_{323} = 15$ to 25 into $x_{423} + 11 > x_{323}$ AND $x_{323} + 7 > x_{423}$ and ANDing them, $x_{423} > 14$ AND $x_{423} < 22$ is obtained.

When $x_{323} = 26$ or more, $x_{323} + 17 > E$ is satisfied.

By substituting $x_{323} = 26$ or more into $x_{323} + 17 > E$ and ANDing them, $43 > E$ is obtained.

Thus, NJ is <u>$43 > E$ AND $x_{311} > 4$ AND $x_{213} > -1$ AND $x_{213} < 13$ AND $x_{133} > 12$ AND $x_{133} < 14$ AND $x_{423} > 14$ AND $x_{423} < 22$</u>.

Fig. 10A (2) When $x_{423}$ = 0 to 3, $x_{423} < 4$ is satisfied.
When $x_{423}$ = 4 to 6,
$x_{213} + 7 > x_{423}$ AND $x_{423} + 11 > x_{213}$ is satisfied
By substituting $x_{423}$ = 4 to 6 into $x_{213} + 7 > x_{423}$ AND $x_{423} + 11 > x_{213}$ and ANDing them,
$x_{213} > -1$ AND $x_{213} < 15$ is obtained.
When $x_{423}$ = 7 to 14,
$x_{133} + 2 > x_{423}$ AND $x_{423} + 11 > x_{133}$ is satisfied.
By substituting $x_{423}$ = 7 to 14 into $x_{133} + 2 > x_{423}$ AND $x_{423} + 11 > x_{133}$ and ANDing them,
$x_{133} > 12$ AND $x_{133} < 18$ is obtained.
When $x_{423}$ = 15 to 21,
$43 > E$ AND $x_{311} > 4$ AND $x_{213} > -1$ AND $x_{213} < 13$ AND $x_{133} > 12$ AND $x_{133} < 14$ AND $x_{423} > 14$ AND $x_{423} < 22$ is satisfied.
By substituting $x_{423}$ = 15 to 21 into $43 > E$ AND $x_{311} > 4$ AND $x_{213} > -1$ AND $x_{213} < 13$ AND $x_{133} > 12$ AND $x_{133} < 14$ AND $x_{423} > 14$ AND $x_{423} < 22$ and ANDing them,
$43 > E$ AND $x_{311} > 4$ AND $x_{213} > -1$ AND $x_{213} < 13$ AND $x_{133} > 12$ AND $x_{133} < 14$ is obtained.
When $x_{423}$ = 22 to 24,
$x_{423} + 11 > x_{431}$ is satisfied.
By substituting $x_{423}$ = 22 to 24 into $x_{423} + 11 > x_{431}$ and ANDing them, $x_{431} < 33$ is obtained.
When $x_{423}$ = 25 or more,
$x_{423} + 18 > E$ is satisfied.
By substituting $x_{423}$ = 25 or more into $x_{423} + 18 > E$ and ANDing them, $43 > E$ is obtained.
Thus, NJ is $\underline{43 > E \text{ AND } x_{311} > 4 \text{ AND } x_{213} > -1 \text{ AND } x_{213} < 13 \text{ AND } x_{133} > 12 \text{ AND } x_{133} < 14 \text{ AND } x_{431} < 33}$.

Fig. 10B (3) Designate $x_{431} = 33$.

(4) Designate $x_{423} = 22$.

(5) Designate $x_{323} = 15$.

(6) Since $x_{332} + 10 > E$ is still satisfied.

Designate $x_{332} = 22$.

Thus, the schedule (2) is obtained.

Now, designate $E = 39$.

Fig. 10C (7) $x_{423} + 18 > E$ is satisfied.
(Although $x_{431} + 7 > E$ is satisfied, $x_{423}$ has precedence over $x_{431}$).
When $x_{423} = 0$ to 3, $x_{423} < 4$ is satisfied.
When $x_{423} = 4$ to 6,
$x_{213} + 7 > x_{423}$ AND $x_{423} + 11 > x_{213}$ is satisfied.
By substituting $x_{423} = 4$ to 6 into $x_{213} + 7 > x_{423}$ AND $x_{423} + 11 > x_{213}$ and ANDing them,
$x_{213} > 1$ AND $x_{213} < 15$ is obtained.
When $x_{423} = 7$ to 14,
$x_{133} + 2 > x_{423}$ AND $x_{423} + 11 > x_{133}$ is satisfied.
By substituting $x_{423} = 7$ to 14 into $x_{133} + 2 > x_{423}$ AND $x_{423} + 11 > x_{133}$ and ANDing them,
$x_{133} > 12$ AND $x_{133} < 18$ is obtained.
When $x_{423} = 15$ to 21,
$43 > E$ AND $x_{311} > 4$ AND $x_{213} > -1$ AND $x_{213} < 13$ AND $x_{133} > 12$ AND $x_{133} < 14$ AND $x_{421} > 14$ AND $x_{423} < 22$ is satisfied.
By substituting $x_{423} = 15$ to 21 into $43 > E$ AND $x_{311} > 4$ AND $x_{213} > -1$ AND $x_{213} < 13$ AND $x_{133} > 12$ AND $x_{133} < 14$ AND $x_{421} > 14$ AND $x_{423} < 22$ and ANDing them, $43 > E$ AND $x_{311} > 4$ AND $x_{213} > -1$ AND $x_{213} < 13$ AND $x_{133} > 12$ AND $x_{133} < 14$ is obtained.
When $x_{423} = 22$ or more,
$x_{423} + 18 > E$ is satisfied.
By substituting $x_{423} = 22$ or more into $x_{423} + 18 > E$ and ANDing them, $40 > E$ is obtained.
Thus, NJ is $\underline{40 > E \text{ AND } x_{311} > 4 \text{ AND } x_{213} > -1 \text{ AND } x_{213} < 13 \text{ AND } x_{133} > 12 \text{ AND } x_{133} < 14}$.

Fig. 11A (8) Designate $x_{133} = 22$ (9) When $x_{423} = 0$ to 3, $x_{423} < 4$ is satisfied.

When $x_{423} = 4$ to 6, $x_{213} + 7 > x_{423}$ AND $x_{423} + 11 > x_{213}$ is satisfied.

By substituting $x_{423} = 4$ to 6 into $x_{213} + 7 > x_{423}$ AND $x_{423} + 11 > x_{213}$ and ANDing them, $x_{213} > -1$ AND $x_{213} < 15$ is obtained.

When $x_{423} = 7$ to 21, $x_{323} + 7 > x_{423}$ AND $x_{423} + 11 > x_{323}$ is satisfied.

By substituting $x_{423} = 7$ to 21 into $x_{323} + 7 > x_{423}$ AND $x_{423} + 11 > x_{323}$ and ANDing them, $x_{323} > 14$ AND $x_{323} < 18$ is obtained.

When $x_{423} = 22$ or more, $x_{423} + 18 > E$ is satisfied.

By substituting $x_{423} = 22$ or more into $x_{423} + 18 > E$ and ANDing them, $40 > E$ is obtained.

Thus, NJ is $40 > E$ AND $x_{213} > -1$ AND $x_{213} < 15$ AND $x_{323} > 14$ AND $x_{323} < 18$ is obtained.

(10) Designate $x_{323} = 7$.

Fig. 11B

(11) When $x_{423}$ = 0 to 3, $x_{423} < 4$ is satisfied.

When $x_{423}$ = 4 to 6, $x_{213} + 7 > x_{423}$ AND $x_{421} + 11 > x_{213}$ is satisfied.

By substituting $x_{423}$ = 4 to 6 into $x_{213} + 7 > x_{423}$ AND $x_{421} + 11 > x_{213}$ and ANDing them, $x_{213} > -1$ AND $x_{213} < 15$ is obtained.

When $x_{423}$ = 7 to 13, $x_{323} + 7 > x_{423}$ AND $x_{423} + 11 > x_{323}$ is satisfied.

By substituting $x_{423}$ = 7 to 13 into $x_{323} + 7 > x_{423}$ AND $x_{423} + 11 > x_{323}$ and ANDing them, $x_{323} > 6$ AND $x_{323} < 18$ is obtained.

When $x_{423}$ = 14 to 23, $x_{133} + 2 > x_{423}$ AND $x_{423} + 11 > x_{133}$ is satisfied.

By substituting $x_{423}$ = 14 to 23 into $x_{133} + 2 > x_{423}$ AND $x_{423} + 11 > x_{133}$ and ANDing them, $x_{133} > 21$ AND $x_{133} < 25$ is obtained.

When $x_{423}$ = 24 or more, $x_{423} + 18 > E$ is satisfied.

By substituting $x_{423}$ = 24 or more into $x_{423} + 18 > E$, $42 > E$ is obtained.

Thus, NJ is $\underline{42 > E \text{ AND } x_{213} > -1 \text{ AND } x_{213} < 15 \text{ AND } x_{323} > 6 \text{ AND } x_{323} < 18 \text{ AND } x_{133} > 21 \text{ AND } x_{133} < 25}$.

Fig. 11C

(12) Designate $x_{133} = 14$.

(13) Designate $x_{423} = 16$

(14) $x_{431} + 7 > E$ is still satisfied.

Designate $x_{431} = 27$.

Thus, the schedule ③ is obtained.

Designate $E = 33$.

Fig. 11D

(15) $x_{423} + 18 > E$ is satisfied (although $x_{431} + 7 > E$ is satisfied, $x_{423}$ has precedence over $x_{431}$).

When $x_{423} = 0$ to 3, $x_{423} < 4$ is satisfied.

When $x_{423} = 4$ to 6, $x_{213} + 7 > x_{423}$ AND $x_{423} + 11 > x_{213}$ is satisfied.

By substituting $x_{423} = 4$ to 6 into $x_{213} + 7 > x_{423}$ AND $x_{423} + 11 > x_{213}$ and ANDing them, $x_{213} > -1$ AND $x_{213} < 15$ is obtained.

When $x_{423} = 7$ to 13, $x_{323} + 7 > x_{423}$ AND $x_{423} + 11 > x_{323}$ is satisfied.

By substituting $x_{423} = 7$ to 13 into $x_{323} + 7 > x_{423}$ AND $x_{423} + 11 > x_{323}$ and ANDing them, $x_{323} > 6$ AND $x_{323} < 18$ is obtained.

When $x_{423} = 14$ to 15, $x_{133} + 2 > x_{423}$ AND $x_{423} + 11 > x_{133}$ is satisfied.

By substituting $x_{423} = 14$ to 15 into $x_{133} + 2 > x_{423}$ AND $x_{423} + 11 > x_{133}$ and ANDing them, $x_{133} > 13$ AND $x_{133} < 25$ is obtained.

When $x_{423} = 16$ or more, $x_{423} + 18 > E$ is satisfied.

By substituting $x_{423} = 16$ or more into $x_{423} + 18 > E$ and ANDing them, $34 > E$ is obtained.

Thus, NJ is $34 > E$ AND $x_{213} > -1$ AND $x_{213} < 15$ AND $x_{323} > 6$ AND $x_{323} < 18$ AND $x_{133} > 13$ AND $x_{132} < 25$.

Fig. 12A

(16) Designate $x_{133}$ = 25.

(17) Designate $x_{423}$ = 14.

(18) $x_{431} + 7 > E$ is still satisfied.
Designate $x_{431}$ = 25.
Thus, the schedule (4) is obtained.
Designate E = 31.

(19) $x_{423} + 18 > E$ is satisfied (although $x_{431} + 7 > E$ is satisfied, $x_{423}$ has precedence over $x_{431}$).
When $x_{423}$ = 0 to 3, $x_{421} < 4$ is satisfied.
When $x_{423}$ = 4 to 6,
$x_{213} + 7 > x_{423}$ AND $x_{423} + 11 > x_{213}$ is satisfied.
By designating $x_{423}$ = 4 to 6 into $x_{213} + 7 > x_{423}$ AND $x_{423} + 11 > x_{213}$ and ANDing them,
$x_{213} > -1$ AND $x_{213} < 15$ is obtained.
When $x_{423}$ = 7 to 13,
$x_{323} + 7 > x_{423}$ AND $x_{423} + 11 > x_{323}$ is satisfied.
By substituting $x_{423}$ = 7 to 13 into $x_{323} + 7 > x_{423}$ AND $x_{423} + 11 > x_{323}$ and ANDing them,
$x_{323} > 6$ AND $x_{323} < 18$ is obtained.

When $x_{423}$ = 14 or more,
$x_{423} + 18 > E$ is satisfied.
By substituting $x_{423}$ = 14 or more into $x_{423} + 18 > E$ and ANDing them, $32 > E$ is obtained.
Thus, NJ is $\underline{32 > E \text{ AND } x_{213} > -1 \text{ AND } x_{213} < 15 \text{ AND } x_{323} > 6 \text{ AND } x_{322} < 18}$.

Fig. 12B

(20) When $x_{323} = 0$, $x_{323} < 1$ is satisfied.

When $x_{323} = 1$ to 5, $x_{311} + 1 > x_{323}$ is satisfied.

By substituting $x_{323} = 1$ to 5 into $x_{311} + 1 >$ $x_{323}$ and ANDing them, $x_{311} > 4$ is obtained.

When $x_{323} = 6$, $x_{213} + 7 > x_{323}$ AND $x_{323} + 7 > x_{213}$ is satisfied.

When $x_{323} = 7$ to 17, $32 > E$ AND $x_{213} > -1$ AND $x_{213} < 15$ AND $x_{323} > 6$ AND $x_{323} < 18$ is satisfied.

By substituting $x_{323} = 7$ to 17 into $32 > E$ AND $x_{213} > -1$ AND $x_{213} < 15$ AND $x_{323} > 6$ AND $x_{323} <$ 18 and ANDing them, $32 > E$ AND $x_{213} > -1$ AND $x_{213} < 15$ is obtained.

When $x_{323} = 18$ or more, $x_{323} + 17 > E$ is satisfied.

By substituting $x_{323} = 18$ or more into $x_{323} + 17$ $> E$ and ANDing them, $35 > E$ is obtained.

Thus, NJ is <u>$32 > E$ AND $x_{213} > -1$ AND $x_{213} < 13$ AND $x_{311} > 4$</u>.

Fig. 12C

(21) When $x_{311}$ = 0 to 4, $x_{111} + 5 > x_{311}$ AND $x_{311} + 1 > x_{111}$ is satisfied.

By substituting $x_{311}$ = 0 to 4 into $x_{111} + 5 > x_{311}$ AND $x_{311} + 1 > x_{111}$ and ANDing them, $x_{111} > -1$ AND $x_{111} < 1$ is obtained.

When $x_{311}$ = 5 or more, $32 > E$ AND $x_{213} > -1$ AND $x_{213} < 13$ AND $x_{311} > 4$ is satisfied.

By substituting $x_{311}$ = 5 or more into $32 > E$ AND $x_{213} > -1$ AND $x_{213} < 13$ AND $x_{311} > 4$ and ANDing them, $32 > E$ AND $X_{213} > -1$ AND $x_{213} < 13$ is obtained.

Thus, NJ is <u>$32 > E$ AND $x_{111} > -1$ AND $x_{111} < 1$ AND $x_{213} > -1$ AND $x_{213} < 13$</u>.

Fig. 12D

(22) Designate $x_{111} = 1$.

(23) Designate $x_{311} = 0$.

(24) When $x_{323} = 0$, $x_{323} < 1$ is satisfied.

When $x_{323} = 1$ to 6, $x_{213} + 7 > x_{323}$ AND $x_{323} + 7 > x_{213}$ is satisfied.

By substituting $x_{323} = 1$ to 6 into $x_{213} + 7 > x_{323}$ AND $x_{323} + 7 > x_{213}$ and ANDing them, $x_{213} > -1$ AND $x_{213} < 8$ is obtained.

When $x_{323} = 7$ to 17, $32 > E$ AND $x_{213} > -1$ AND $x_{213} < 15$ AND $x_{321} > 6$ AND $x_{323} < 18$ is satisfied.

By substituting $x_{323} = 7$ to 17 into $32 > E$ AND $x_{213} > -1$ AND $x_{213} < 15$ AND $x_{321} > 6$ AND $x_{323} < 18$ and ANDing them, $32 > E$ AND $x_{213} > -1$ AND $x_{213} < 15$ is obtained.

When $x_{323} = 18$ or more, $x_{323} + 17 > E$ is satisfied.

By substituting $x_{323} = 18$ or more into $x_{323} + 17 > E$ and ANDing them, $35 > E$ is obtained.

Thus, NJ is $\underline{32 > E \text{ AND } x_{313} > -1 \text{ AND } x_{313} < 8}$.

(25) Designate $x_{213} = 8$.

(26) Designate $x_{323} = 1$.

Fig. 13A

(27) When $x_{423}$ = 0 to 3, $x_{423} < 4$ is satisfied.

When $x_{423}$ = 4 to 7, $x_{323} + 7 > x_{423}$ AND $x_{423} + 11 > x_{323}$ is satisfied.

By substituting $x_{423}$ = 4 to 7 into $x_{323} + 7 > x_{423}$ AND $x_{423} + 11 > x_{323}$ and ANDing them, $x_{323} > 0$ AND $x_{323} < 15$ is obtained.

When $x_{423}$ = 8 to 14, $x_{213} + 7 > x_{423}$ AND $x_{423} + 11 > x_{213}$ is satisfied.

By substituting $x_{423}$ = 8 to 14 into $x_{213} + 7 > x_{423}$ AND $x_{423} + 11 > x_{213}$ and ANDing them, $x_{213} > 7$ AND $x_{213} < 19$ is obtained.

When $x_{423}$ = 15 or more, $x_{423} + 18 > E$ is satisfied.

By substituting $x_{423}$ = 15 or more into $x_{423} + 18 > E$ and ANDing them, $33 > E$ is obtained.

Thus, NJ is $\underline{33 > E \text{ AND } x_{323} > 0 \text{ AND } x_{323} < 15 \text{ AND } x_{213} > 7 \text{ AND } x_{213} < 19}$.

Fig. 13B

(28) When $x_{213}$ = 0 to 7, $32 > E$ AND $x_{213} > -1$ AND $x_{213} < 8$ is satisfied.

By substituting $x_{213}$ = 0 to 7 into $32 > E$ AND $x_{213} > -1$ AND $x_{213} < 8$ and ANDing them, $32 > E$ is obtained.

When $x_{213}$ = 8 to 18, $33 > E$ AND $x_{323} > 0$ AND $x_{323} < 15$ AND $x_{213} > 7$ AND $x_{213} < 19$ is satisfied.

By substituting $x_{213}$ = 8 to 18 into $33 > E$ AND $x_{323} > 0$ AND $x_{323} < 15$ AND $x_{213} > 7$ AND $x_{213} < 19$ and ANDing them, $33 > E$ AND $x_{323} > 0$ AND $x_{323} < 15$ is obtained.

When $x_{213}$ = 19 or more, $x_{213} + 19 > E$ is satisfied.

By substituting $x_{213}$ = 19 or more into $x_{213} + 19 > E$ and ANDing them, $38 > E$ is obtained.

Thus, NJ is $\underline{32 > E \text{ AND } x_{323} > 0 \text{ AND } x_{323} < 15}$.

(29) When $x_{323}$ = 0, $x_{323} < 1$ is satisfied.

When $x_{323}$ = 1 to 14, $32 > E$ AND $x_{323} > 0$ AND $x_{323} < 15$ is satisfied.

By substituting $x_{323}$ = 1 to 14 into $32 > E$ AND $x_{323} > 0$ AND $x_{323} < 15$ and ANDing them, $32 > E$ is obtained.

When $x_{323}$ = 15 or more, $x_{323} + 17 > E$ is satisfied.

By substituting $x_{323}$ = 15 or more into $x_{323} + 17 > E$ and ANDing them, $32 > E$ is obtained.

Thus, the final NJ is $\underline{32 > E}$.

Fig. 13C

SCHEDULE (3)

MACHINE 1: 111 (5-6), 311 (6-7), 221 (7-10)
MACHINE 2: 412 (4-5), 122 (5-10), 232 (10-13), 332 (13-22... ), 431 (27-34)

MACHINE 1: | 111 | 311 | 221 |  at 5, 6, 7, 10; then 431 at 27-34
MACHINE 2: | 412 | 122 | 232 | 332 | at 4, 5, 10, 13, 22, 32 — and 332 ends at 32? The layout: 412 (4-5), 122 (5-10), 232 (10-13)?, then something to 22, 332 to 32

OPTIMUM SCHDULE (4)

| Machine | Jobs (start–end) |
|---|---|
| MACHINE 1 | 111 [–5], 311 [5–6], 221 [6–7–10], 431 [25–32] |
| MACHINE 2 | 412 [4–5], 122 [5–7–13], 232 [13–22], 332 [22–25–32] |
| MACHINE 3 | 213 [–7], 323 [7–14], 423 [14–25], 133 [25–27] |

JOB SCHEDULING SYSTEM FOR DESIGNATING PROCEDURE START TIMES

BACKGROUND OF THE INVENTION

1. Field of the Invention

The present invention relates to a job scheduling system for solving scheduling problems such as a production programming, and in particular, to a scheduling system for generating restriction violating conditions or restriction satisfying conditions and properly using these conditions in later processes so as to effectively set out a schedule.

2. Description of the Related Art

Scheduling problems such as production programming include job shop scheduling problem.

In a job shop scheduling problem, each of n jobs is composed of m procedures. Each procedure is processed by one of m machines. Each machine cannot execute two or more procedures at the same time. Each procedure has a process time period, an available start time, and an end time. Procedures which compose one job are sequentially related. The start time of each procedure should be designated so that the total process time period becomes minimum.

The solution space of this scheduling problem tends to potentially become large due to the presence of many combinations. Thus, a simple search system cannot be used. However, in the apparent solution space, portions where solutions are not present can be sometimes found. Therefore, by properly using this technique, a solution can be effectively obtained.

Known techniques of this kind which are conventionally used are, (a) integer programming method, (b) branch and bound method, and (c) ATMS. Next, with respect to these techniques for solving a job scheduling problem, examples for minimizing the total process time period will be described.

(a) Integer Programming Method

In addition to variables with respect to the start time and end time of each procedure of each job, to represent a condition where two procedures are not processed by the same machine at the same time variables 0–1 with respect to the sequence of procedures executed by the same machine is introduced. However, this process results in increasing the number of variables. In addition, the computing time of the integer programming method tends to exponentially increase proportional to the number of variables. Thus, the computing time period becomes excessively long.

(b) Branch and Bound Method

In the condition where the start times of some of procedures have not been designated (namely in a partial schedule), the lower bound value of the total processing time period is obtained by using the total process time period of procedures which have not been scheduled (with respect to individual jobs and individual machines). When the lower bound value is larger than the value of the total process time period of the complete scheduling which has been obtained, schedules which contain the partial schedule are removed from the search object. However, in this method, the process time periods of procedures which have not been scheduled are computed with respect to individual jobs or individual machines. Thus, the relation of a plurality of jobs cannot be considered. As a result, the lower bound value is underestimated. Therefore, the search range cannot be effectively narrowed.

(c) ATMS

The sequence of procedures executed by a particular machine is treated as a hypothesis. The combinations of hypotheses which cannot satisfy restriction conditions are stored. The combinations which contain these hypotheses are discarded. However, since the number of combinations of hypotheses becomes huge, the scale that can be dealt with is restricted.

The problems involved in these three methods are summarized as follows.

In the integer programming method, since the number of variables increases, the computing time exponentially increases. In the branch and bound method, the lower bound value is underestimated. On the other hand, in the ATMS, since the number of combinations of hypotheses increases, the computing time period increases.

SUMMARY OF THE INVENTION

An object of the present invention is to provide a scheduling system for designating start times of a plurality of procedures processed by a plurality of resources such as machines, having restriction conditions with respect to available start times, end times, sequence of procedures, and prohibition of simultaneous executions of multiple procedures, the scheduling system being adapted to maximally use earlier-obtained failure information in a later process so as to effectively solve the scheduling problem.

A feature of the present invention resides in a scheduling system for designating start times of a plurality of procedures processed by a plurality of resources such as machines, having restriction conditions with respect to available start times, end times, sequence of procedures, and prohibition of simultaneous executions of multiple procedures, the system comprises an initial restriction violating condition set portion for initially setting a restriction violating condition which is a sufficient condition of the violation of the restriction conditions, a start time change portion for changing the start time of a procedure whose start time has been designated, a start time designation portion for designating the start time of a procedure whose start time has not been designated, a restriction violating condition generation portion for substituting starts times of a procedure which satisfy at least one of the restriction violating conditions into the variable of the procedure and ANDing them so as to generate a new restriction violating condition, the start times being changed and designated by the start time change portion and the start time designation portion, respectively, a restriction violating condition storage portion for storing restriction violating conditions generated by the initial restriction violating condition set portion and the restriction violating condition generation portion, wherein any restriction violating condition stored in the restriction violating condition storage portion is not satisfied when the start time of a procedure is changed or designated.

Another feature of the present invention resides in a scheduling system for designating start times of a plurality of procedures processed by a plurality of resources such as machines, having restriction conditions with respect to available start times, end times, sequence of procedures, and prohibition of simultaneous executions of multiple procedures, said system comprises an initial restriction satisfying condition set portion for initially setting a restriction satisfying condition which is a necessary condition of said restriction conditions, a start time change portion for changing the start time of a procedure whose start time has been designated, a start time designation portion for designating the start time of a procedure whose start time has not been designated, a restriction satisfying condition generation portion for substituting starts times of a procedure which do not satisfy at least one of said restriction satisfying conditions into the variable of the procedure and ANDing them so as to generate a new restriction satisfying condition, the start times being changed and designated by said start time change portion and said start time designation portion, respectively and a restriction satisfying condition storage portion for storing restriction satisfying conditions generated by said initial restriction satisfying condition set portion and said restriction satisfying condition generation portion, wherein the start time of a procedure is changed or designated such that none of the restriction violating conditions stored in said restriction violating condition storage portion are satisfied.

BRIEF DESCRIPTION OF DRAWINGS

One skilled in the art can easily understand additional features and objects of this invention from the description of the preferred embodiments and some of the attached drawings. In the drawings:

FIG. 5A is a first problem for obtaining an optimum schedule;

FIG. 5B is a diagram for explaining a process of the embodiment;

FIGS. 6A to 6C are diagrams continued from FIG. 5B;

FIGS. 7A and 7B are diagrams continued from FIG. 6C;

FIG. 9A is a second problem for obtaining an optimum schedule;

FIG. 9B is a diagram for explaining a job shop scheduling process with respect to four jobs and three machines;

FIGS. 10A to 10C are diagrams continued from FIG. 9B;

FIGS. 11A to 11D are diagrams continued from FIG. 10C;

FIGS. 12A to 12D are diagrams continued from FIG. 11D;

FIGS. 13A to 13C are diagrams continued from FIG. 12D;

These and other objects, features and advantages of the present invention will become more apparent in light of the following detailed description of a best mode embodiment thereof, as illustrated in the accompanying drawings.

DESCRIPTION OF PREFERRED EMBODIMENTS

Figure 1:
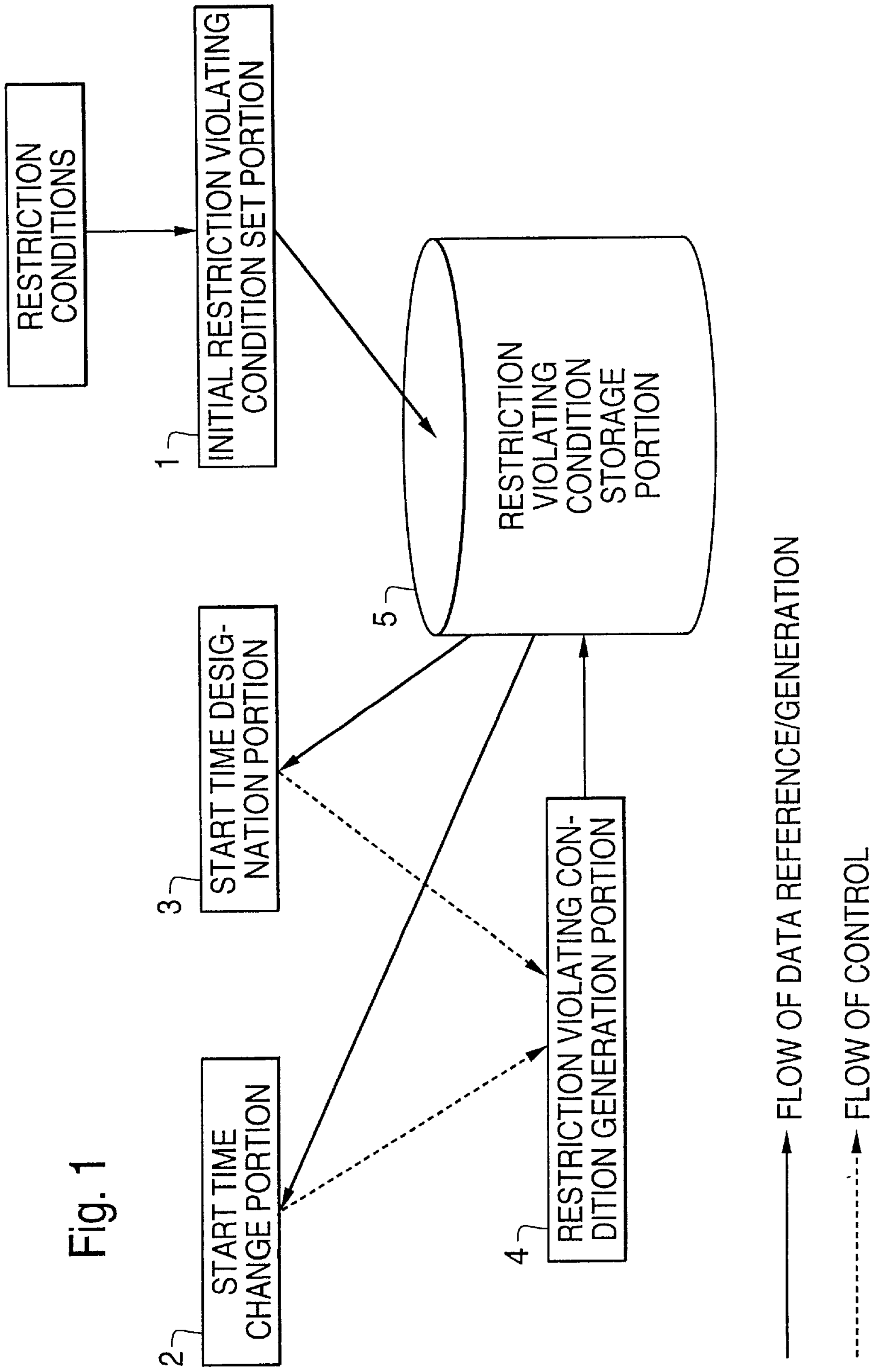
FIG. 1 is a block diagram showing the construction of a first aspect of the present invention.

FIG. 1 shows the theoretical construction of a first aspect of the present invention. The first aspect of the present invention is a scheduling system for designating start times of a plurality of procedures processed by a plurality of resources such as machines, having restriction conditions with respect to available start times, end times, sequence of procedures, and prohibition of simultaneous executions of multiple procedures, the system comprising an initial restriction violating condition set portion 1 for initially setting a restriction violating condition which is a sufficient condition of the violation of the restriction conditions, a start time change portion 2 for changing the start time of a procedure whose start time has been designated, a start time designation portion 3 for designating the start time of a procedure whose start time has not been designated, a restriction violating condition generation portion 4 for substituting start times of a procedure which satisfy at least one of the restriction violating conditions into a variable of one of restriction violating conditions and ANDing said conditions so as to generate a new restriction violating condition, the start times being changed and designated by the start time change portion 2 and the start time designation portion 3, respectively, a restriction violating condition storage portion 5 for storing restriction violating conditions generated by the initial restriction violating condition set portion 1 and the restriction violating condition generation portion 4, wherein any restriction violating condition stored in the restriction violating condition storage portion 5 is not satisfied when the start time of a procedure is changed or designated.

Figure 2:
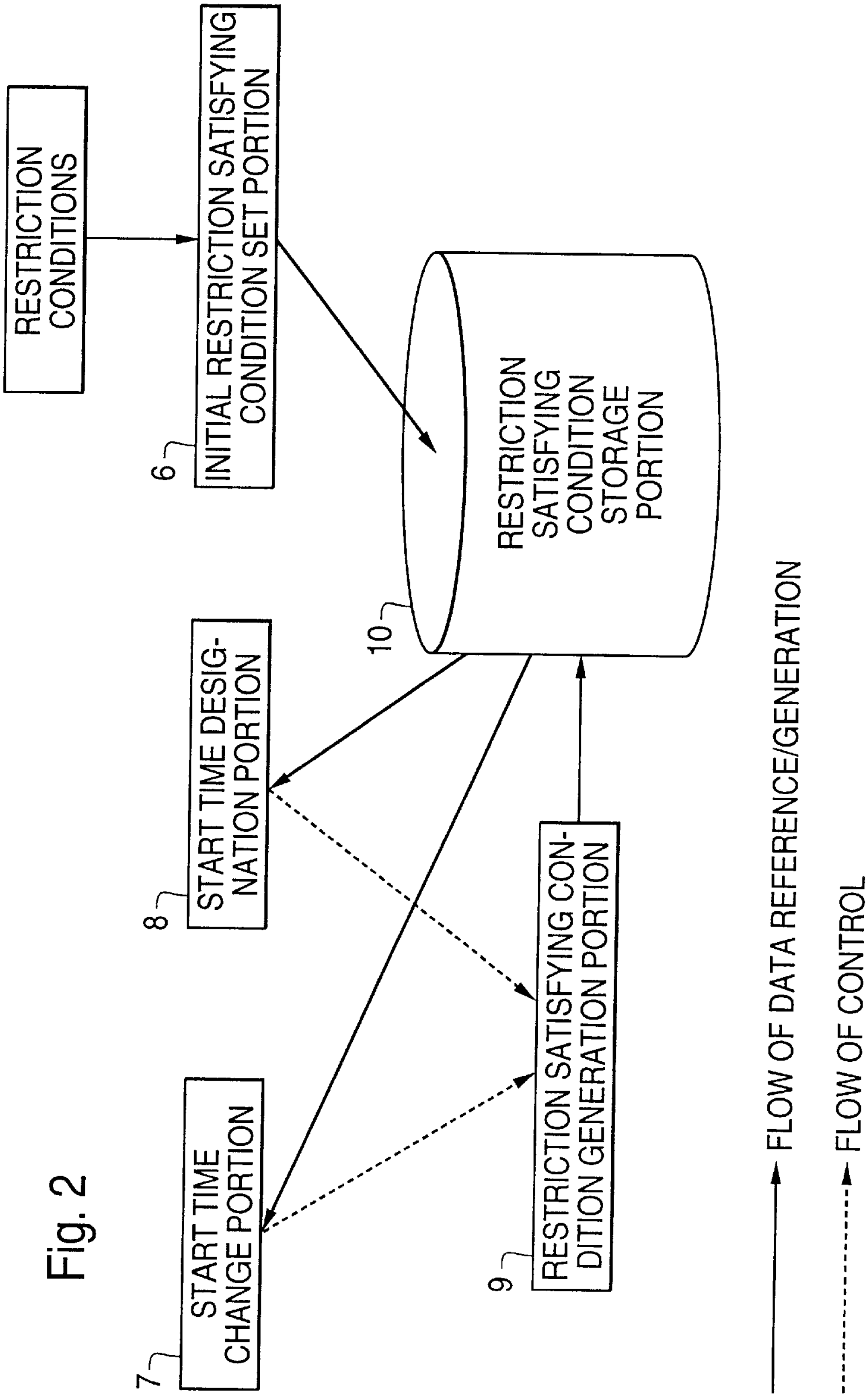
FIG. 2 is a block diagram showing the construction of a second aspect of the present invention.

FIG. 2 shows the theoretical construction of a second aspect of the present invention. The second aspect of the present invention is a scheduling system for designating start times of a plurality of procedures processed by a plurality of resources such as machines, having restriction conditions with respect to available start times, end times, sequence of procedures, and prohibition of simultaneous executions of multiple procedures, the system comprising an initial restriction satisfying condition set portion 6 for initially setting a restriction satisfying condition which is a necessary condition of the restriction conditions, a start time change portion 7 for changing the start time of a procedure whose start time has been designated, a start time designation portion 8 for designating the start time of a procedure whose start time has not been designated a restriction satisfying condition generation portion 9 for substituting start times of a procedure which do not satisfy at least one of the restriction satisfying conditions into a variable of one of the restriction violating conditions and ANDing the conditions so as to generate a new restriction satisfying condition, the start times being changed and designated by the start time change portion 7 and the start time designation portion 8, respectively, and a restriction satisfying condition storage portion 10 for storing restriction satisfying conditions generated by the initial restriction satisfying condition set portion 6 and the restriction satisfying condition generation portion 9, wherein the start time of a procedure is changed or designated such that none of the restriction violating conditions stored in said restriction violating condition storage portion 5 are satisfied.

Next, the operation of the theoretical construction of the first aspect of the present invention (FIG. 1) will be described.

As described above, the first aspect of the present invention is a scheduling system for designating start times of a plurality of procedures processed by a plurality of resources such as machines, having restriction conditions with respect to available start times, end times, sequence of procedures, and prohibition of simultaneous executions of multiple procedures.

The initial restriction violating condition set portion 1 negates the received restriction conditions so as to set an initial restriction violating condition. Thereafter, the initial restriction violating condition set portion 1 stores the initial restriction violating condition in the restriction violating condition storage portion 5.

The initial restriction violating condition set portion 1 searches for a restriction violating condition which is satisfied from amongst the conditions in the restriction violating condition storage portion 5. When there is a restriction violating condition which is satisfied, the start time change portion 2 is activated. The start time change portion changes the start times of the procedures so that none of the restriction violating conditions are satisfied. When there is no start time which leaves all the restriction violating conditions unsatisfied, the restriction violating condition generation portion 4 is activated. The restriction violating condition generation portion 4 ANDs the restriction violating conditions which are satisfied so as to generates a new restriction violating condition and stores it in the restriction violating condition storage portion 5.

When the start times of the procedures can be changed so that they satisfy none of the restriction violating condition and there is no procedure whose start time has not been designated, the scheduling is successful. Thus, a schedule which satisfies the given conditions is obtained.

When there is a procedure whose start time has not been designated, the start time designation portion 3 is activated. The start time designation portion 3 designates a start time of the procedure which does not satisfy all the restriction violating conditions. When a start time which does not satisfy all the restriction violating conditions can be designated and there is no procedure whose start time has not been designated, the scheduling is successful. When a start time of the procedure which does not satisfy all the restriction violating conditions cannot be designated, the restriction violating condition generation portion 4 is activated. The restriction violating condition generation portion 4 ANDs the restriction violating conditions which are satisfied so as to generate a new restriction violating condition and stores it in the restriction violating condition storage portion 5.

After the new restriction violating condition is stored in the restriction violating condition storage portion 5, the start time change portion 2 and the start time designation portion 3 are activated. At this point, if there is no variable of a start time to be changed or designated, the scheduling is unsuccessful.

As described above, when a restriction violating condition is generated, it becomes a sufficient condition for the violation of the given restrictions. When any start time of a procedure satisfies at least one of the restriction violating conditions, values are substituted into the variable of the relevant procedure so as to generate a new restriction violating condition. Thus, the procedures whose start times need to be changed are limited and the range of the start times is narrowed. Moreover, by ANDing two or more inequalities, the sufficient condition of a restriction violation due to the relation of two or more jobs can be expressed.

Next, the operation of the theoretical construction of the second aspect (FIG. 2) of the present invention will be described.

First, the initial restriction satisfying condition set portion 6 sets an initial restriction satisfying condition which is a necessary condition for the satisfaction of the given restriction conditions and stores it in the restriction satisfying condition storage portion 10.

Next, the initial restriction satisfying condition set portion 6 searches the restriction satisfying conditions stored in the restriction satisfying condition storage portion 10. When there is a restriction satisfying condition which is not satisfied, the start time change portion 7 is activated. The start time change portion 7 changes the start times of the procedures so that all the restriction satisfying conditions are satisfied. When there is no start time which satisfies all the restriction satisfying conditions, the restriction satisfying condition generation portion 9 is activated. The restriction satisfying condition generation portion 9 ANDs the restriction satisfying conditions which are not satisfied so as to generate a new restriction satisfying condition and stores it in the restriction satisfying condition storage portion 10.

The start time change portion 7 changes the start times of the procedures so that all the restriction satisfying conditions are satisfied. When there is no procedure whose start time has not been designated, the scheduling is successful. Thus, a schedule which satisfies the given conditions is obtained.

When there is a procedure whose start time has not been designated, the start time designation portion 8 is activated. The start time designation portion 8 designates a start time of the procedure which satisfies all the restriction satisfying conditions. When a start time of the procedure which satisfies all the restriction satisfying conditions can be designated and there is no procedure whose start time has not been designated, the scheduling is successful. When a start time of the procedure which satisfies all the restriction satisfying conditions cannot be designated, the restriction satisfying condition generation portion 9 is activated. The restriction satisfying condition generation portion 9 ANDs the restriction satisfying conditions which are satisfied so as to generate a new restriction satisfying condition and stores it in the restriction satisfying condition storage portion 10.

After the new restriction satisfying condition is stored in the restriction satisfying condition storage portion 10, the start time change portion 7 and the start time designation portion 8 are activated. When there is no variable of a start time to be changed or designated, the scheduling is unsuccessful.

As described above, when a restriction satisfying condition is generated, it becomes a necessary condition for the satisfaction of restrictions for a schedule which satisfies the given restriction conditions. When any start time of a procedure does not satisfy at least one of restriction satisfying conditions, values are substituted into the variable of the relevant procedure so as to generate a new restriction satisfying condition. Thus, the procedures whose start times should be changed are limited and the range of the start times is narrowed. Moreover, by ANDing two or more inequalities, a necessary condition for preventing a restriction violation due to the relation of two or more jobs can be expressed.

In the theoretical construction of the first aspect (FIG. 1) of the present invention, when the available start time and the end time of each procedure contained in the restriction violating conditions are variables, by changing the values of the variables whose values have already been changed, a restriction violating condition which was generated before changes of the available start time and the end time can be used as it is.

In the theoretical construction of the first aspect (FIG. 1) of the present invention, when the value of a variable representing the available start time or the end time is updated to a stricter value whenever one schedule is obtained and a restriction condition containing only a variable representing the available start time and the end time is generated due to unsuccessful scheduling, an available start time or an end time at which a restriction violation always takes place is expressed, thereby obtaining an optimum schedule such as a schedule with a minimum total process time period.

In the theoretical construction of the second aspect (FIG. 2) of the present invention, when the available start time and the end time of each procedure contained in restriction satisfying conditions are variables, by changing the values of the variables whose values were changed, a restriction satisfying condition which was generated before changes of the available start time and the end time can be validated.

In the theoretical construction of the first aspect (FIG. 1) of the present invention, when the value of a variable representing the available start time or the end time is updated to a stricter value whenever one schedule is obtained and a restriction satisfying condition containing only a variable representing the available start time and the end time is generated due to unsuccessful scheduling, an available start time or an end time of a scheduling which satisfies the restrictions is expressed, thereby obtaining an optimum schedule such as a schedule with a minimum total process time period.

Figure 3:
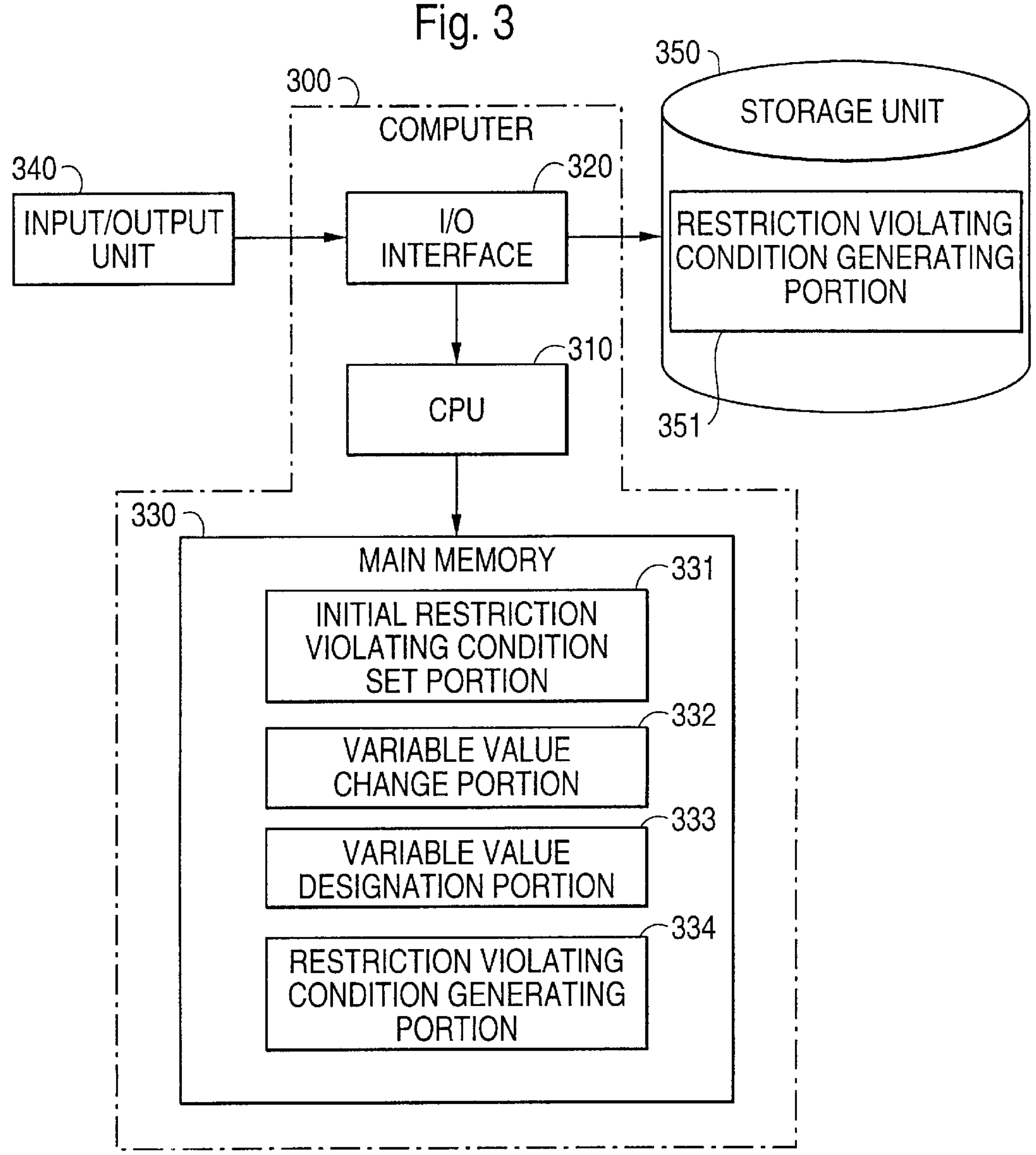
FIG. 3 is a block diagram showing the system construction of an embodiment according to the present invention.

FIG. 3 is a block diagram showing the system configuration of an embodiment according to the present invention. The embodiment has the theoretical construction shown in FIG. 1. The embodiment can be constructed of a computer system 300 which comprises a CPU 310, an I/O interface 320, a main memory 330, an input/output unit 340, and a storage unit 350. In addition, the theoretical construction shown in FIG. 2 can be accomplished with a system construction similar to the computer system 300.

The main memory 330 stores software relating to an initial restriction violating condition set portion 331, a variable value change portion 332, a variable value designation portion 333, and a restriction violating condition generation portion 334 corresponding to the portions of the theoretical construction shown in FIG. 1. The CPU 310 executes a scheduling process according to the software. The storage unit 350 has a restriction violating condition storage portion 351 which stores restriction violating conditions generated by the initial restriction violating condition set portion 331 and the restriction violating condition generation portion 334. The restriction violating condition storage portion 351 may be disposed in the main memory 330.

Next, with reference to an operational flow chart of FIG. 4, the system operation will be described.

The user who wants to solve a job shop scheduling problem will input, via the input/output unit 340, restriction conditions as a problem. After he inputs the restriction conditions, the CPU 310 activates the initial restriction violating condition set portion 331. Thus, the initial restriction violating condition set portion 331 generates restriction violating conditions by using all the restriction conditions that it received and stores them in the restriction violating condition storage portion 351 (at step S1).

Next, the CPU 310 generates an initial schedule (at step S2). An initial schedule satisfies the restriction conditions being received. However, it is uncertain whether or not the initial schedule is optimum. This initial schedule can be obtained by the so called Giffler-Thompson technique or the like (refer to "Integer Programming Method and Optimum Combination", published by Nihon Kagaku Rengo, 1982, pp 291).

In this embodiment, the CPU 310 executes a scheduling process according to the initial schedule and the initial restriction violating conditions.

The initial restriction violating condition set portion 331 searches for a restriction violating condition from amongst the restriction violating condition storage portion 351 and determines whether or not it is satisfied (at step S3). A restriction violating condition is abbreviated as NJ. When there is a satisfied restriction violating condition NJ (namely, the determined result at step S3 is YES), the CPU 310 activates the variable value change portion 332. The variable value change portion 332 changes the start time of each procedure on the schedule so that all the restriction violating conditions are unsatisfied (at step S4). Next, the CPU 310 determines whether or not there is a start time which does not satisfy any of the restriction violating conditions (at step S5). When such a start time is not present (namely, any change of the start time satisfies at least one of the restriction violating conditions) (the determined result at step S5 is YES), the CPU 310 activates the restriction violating condition generation portion 334 (at steps 9 and 10). This process will be described later in detail.

On the other hand, when there is a start time which does not satisfy any of the restriction violating conditions in the start time change process (S4) (namely, the determined result at step S5 is NO), the CPU 310 determines whether or not there is a procedure whose start time has not been designated (at step S6). When there is no procedure whose start time has not been designated (namely, the determined result at step S6 is NO), the start times of all the procedures, which start times satisfy none of the restriction violating conditions, have been designated. At this point, since the scheduling is successful, the CPU 310 completes the process.

On the other hand, when there is a procedure whose start time has not been designated (namely, the determined result at step S6 is YES), the CPU 310 activates the variable value designation portion 333. The variable value designation portion 333 designates the start time which has not already been designated so that it does not satisfy the restriction violating conditions (at step S7). Thereafter, the CPU 310 determines whether or not such a start time has been designated at step S5.

When a variable value which does not satisfy the restriction violating conditions cannot be designated in the start time change process S4 and the start time designation process S5 (namely, the determined result at step S5 is YES), the CPU 310 activates the restriction violating condition generation portion 334.

The restriction violating condition generation portion 334 ANDs restriction violating conditions which are satisfied in the start time change process S4 or the start time designation process S5 so as to generate a new restriction violating condition (at step S8). The CPU 310 determines whether or not a variable is still present in the left hand side of this restriction violating condition (at step S9). When there is no variable in the left hand side (namely, the determined result at step S9 is NO), the CPU 310 does not continue the scheduling process. Thus, the schedule is unsuccessful. On the other hand, when there is still a variable (namely, the determined result at step 9 is YES), the restriction violating condition generation portion 334 stores the restriction violating condition in the restriction violating condition storage portion 351. Then, the CPU 310 repeats the scheduling process at step S4.

With the above processes, the CPU 310 executes the scheduling process so as to generate an optimum schedule.

Next, by using a real job shop scheduling problem, the scheduling system according to the embodiment will be described.

Now a job scheduling problem with respect to three jobs and two machines is assumed. This problem is small and used to explain the flow of processes of the embodiment. FIGS. 5A to 7B show the content of the problem. Hereinafter, this problem is referred to as the problem 1.

An optimum schedule on which two machines each perform three jobs (minimum total process time period) is to be obtained. The jobs are referred to as the jobs 1, 2 and 3. The machines are referred to as machines 1 and 2.

First, the job 1 uses for the procedure 1 the machine 1 (since the procedure 1 of the job 1 uses the machine 1, this process is denoted by 111). The job 1 uses for the procedure 2 the machine 2 (122). The process time period of the procedure 1 of the job 1 is 6, whereas the process time period of the procedure 2 of the job 1 is 4.

The job 2 uses for the procedure 1 the machine 2 (212). The job 2 uses for the procedure 2 the machine 1 (221). The process time period of the procedure 1 of the job 2 is 4, whereas the process time period of the procedure 2 of the job 2 is 3. The job 3 uses for the procedure 1 the machine 1 (311). The job 3 uses for the procedure 2 the machine 2 (322). The process time period of the procedure 1 of the job 1 is 2, whereas the process time period of the procedure 2 of the job 2 is 5.

In addition, one machine cannot execute two or more procedures at the same time.

Under these restriction conditions, the start time of each procedure is to be optimally scheduled. In the following description, the start time variable of procedure j (machine k) of job i is denoted by $x_{ijk}$.

First, the CPU 310 activates the initial restriction violating condition set portion 331 (S1). Thus, the initial restriction violating condition set portion 331 generates initial restriction violating conditions according to the conditions in the tables of the problem 1 shown in FIG. 5A. The initial restriction violating conditions of this problem are given in FIG. 5B. The initial restriction violating conditions include conditions with respect to available start times (see FIG. 5B (a)), end times (see FIG. 5B (b)), sequence of procedures (see FIG. 5B (c)), and prohibition of simultaneous executions of multiple procedures by same machine (see FIG. 5B (d)).

With respect to the available start times, for example the processes 111, 212, and 311 can be started after time 0. By negating these conditions, $x_{111}<0$, $x_{212}<0$, $x_{311}<0$ are obtained as restriction violating conditions. In addition, since the procedure 2 of each job cannot be started unless the procedure 1 of each job has been completed, the process 122 can only be started after the process time period 6 of the procedure 1 elapsed. Thus, by negating this condition, $x_{122}<6$ is obtained as a restriction violating condition. Likewise, a restriction violating condition with respect to the available start time of each job is set (see FIG. 5B (a)).

With respect to end times, variable E is used. The end time E of the job 1 should occur after the procedure 1 and the procedure 2. Thus, the end time should occur at or after time 10 where the process time 6 of the procedure 1 and the process time 4 of the procedure 2 are added. Thus, by negating this condition, $x_{111}+10>E$ is generated as a restriction violating condition. Likewise, with respect to the end time, an initial restriction violating condition of each procedure of each job can be set (see FIG. 5B (b)).

With respect to sequence of procedures, the procedure 2 of the job 1 cannot be started unless the procedure 1 of the job 1 has been completed. Thus, the procedure 2 of the job 1 can only be started at or after the time where the start time of the procedure 1, $x_{111}$, and the process time 6 are added. By negating this condition, $x_{111}+6>x_{122}$ is obtained as a restriction violating condition. Likewise, with respect to sequence of procedures, restriction violating conditions can be set (see FIG. 5B (c)).

Last, with respect to prohibition of simultaneous executions of multiple procedures by the same machine, restriction conditions are given. For example, while the process 111 is being executed (namely, $x_{111}<t<x_{111}+6$, where t=time), the process 221 which is processed by the same machine cannot be executed. Thus, $x_{111}+6\leqq x_{221}$ is obtained as restriction condition (①). Alternatively, while the process 221 is being executed, the process 111 cannot be executed. Thus, $x_{221}+3\leqq x_{111}$ is obtained as restriction condition (②). By using the restriction condition ① OR ②, $x_{111}+6>x_{221}$ AND $x_{221}+3>x_{111}$ is obtained as a restriction violating condition. Likewise, for all procedures executed by the same machine (the processes 111 and 311 executed by the machine 1, the processes 311 and 221 executed by the machine 1, the processes 122 and 212 executed by the machine 2, the processes 122 and 322 executed by the machine 2, and the processes 212 and 322 executed by the machine 2), with respect to prohibition of simultaneous executions, initial restriction violating conditions are obtained (see FIG. 5B (d)).

Figure 4:
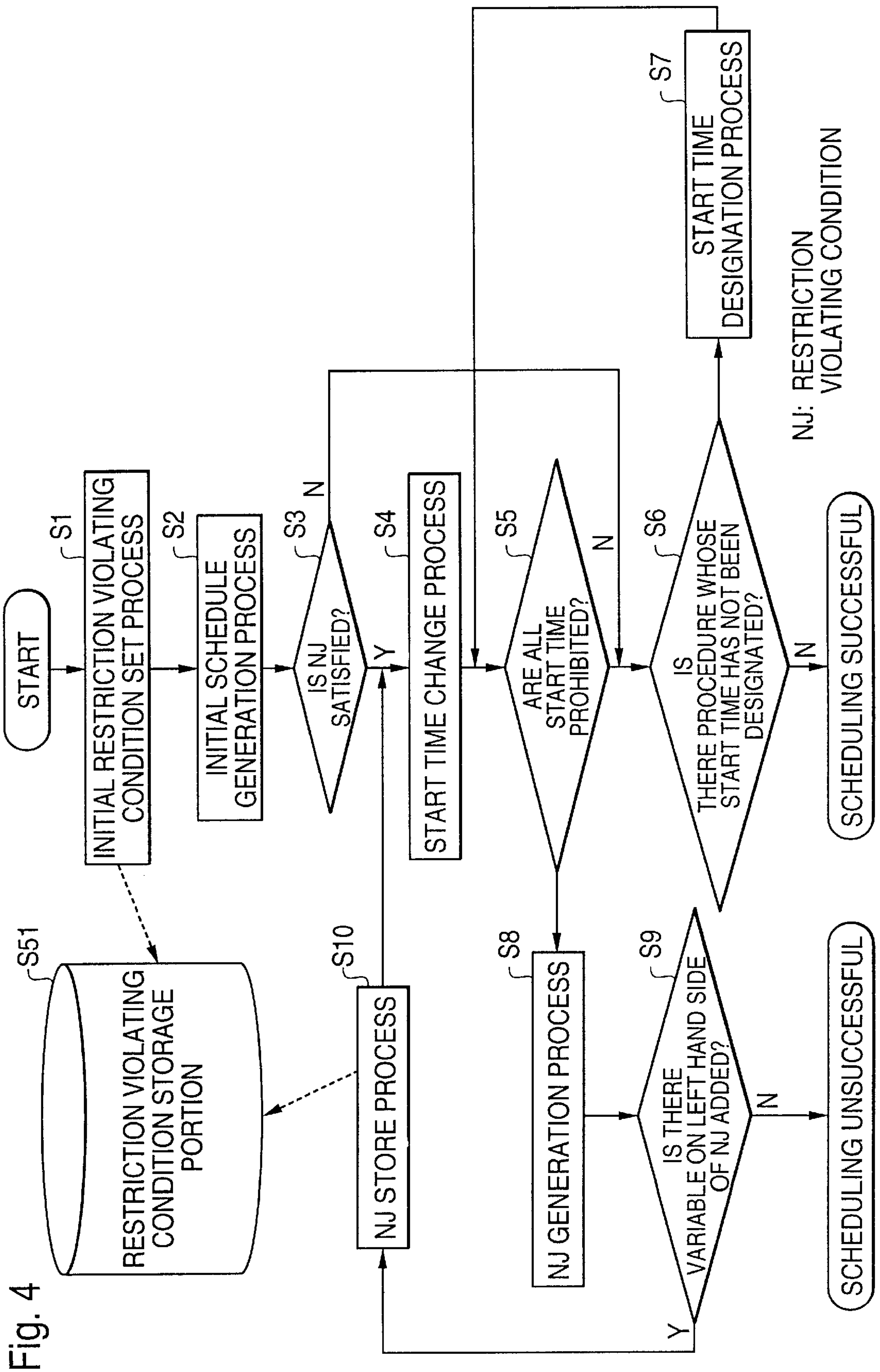
FIG. 4 is a flow chart showing the operation of the embodiment.

After the above initial restriction violating conditions are set, the CPU 310 starts the scheduling process according to an initial schedule (see FIG. 8 ①) (at step S2 of FIG. 4). The initial schedule is a schedule which satisfies the restriction violating conditions which has been set. On this initial schedule, the end time E is 15.

In the scheduling process, each procedure is executed with an earlier end time (for example E=14).

First, according to the initial schedule (see FIG. 8 ①), the restriction violating condition generation portion 334 searches for initial restriction violating conditions which are satisfied (at step 3 of FIG. 4). For example, the restriction condition $x_{111}+10>E$, relating to the end time, is not satisfied since $x_{111}=0$ and E=14. By repeating the scheduling process, it is found that $X_{322}+5>E$ is satisfied (this is because $x_{322}=10$ and E=14) (see FIG. 6A (1)).

Next, the CPU 310 activates the start time change portion 332 at step S4. Thus, the variable value change portion 332 successively changes the start time of each procedure contained in a restriction violating condition which is satisfied. Thus, when $x_{322}=0$ to 1, $x_{322}<2$ is satisfied as a restriction violating condition with respect to an available start time. When $x_{322}=2$ to 7, they satisfy $x_{311}+2>x_{322}$ (this is because $x_{311}=6$). When $x_{322}=8$ to 9, they satisfy $x_{122}+4>x_{322}$ AND $x_{322}+5>x_{122}$ (this is because $x_{122}=6$). When $x_{322}=10$ or more, they satisfy $x_{322}+5>E$ (see FIG. 6A (1)).

Thus, it is found that all start times are prohibited by the process at step S5 of FIG. 4 (namely, the determined result is YES). Next, the CPU 310 activates the initial restriction violating condition generation portion 334. Thus, the initial restriction violating condition generation portion 334 newly generates a restriction violating condition (at step S8).

In other words, the restriction violating condition generation portion 334 substitutes each start time into $x_{322}$ of restriction violating conditions which are satisfied and ANDs them. For example, by substituting $x_{322}=2$ to 7 into $x_{311}+2>x_{322}$ ($x_{311}+2>2$, $x_{311}+2>3$, . . . , $x_{311}+2>7$) and ANDing them, $x_{311}>5$ is obtained. By repeating the same process for each of the remaining expressions which are satisfied (namely, $x_{122}+4>x_{322}$ AND $x_{322}+5>x_{122}$, $x_{322}+5>E$), $x_{122}>5$ AND $x_{122}<13$ and 15>E are obtained. Next, by ANDing these expressions, a new restriction violating condition is obtained (see the underlined expression of FIG. 6A (1)).

Since the left hand side of the new restriction violating condition contains a variable (namely, the determined result at step S9 is YES), the restriction violating condition generation portion 334 stores the restriction violating condition in the restriction violating condition storage portion 351 (at step S10). With these processes, this new restriction violating condition has been newly added to the initial restriction violating conditions.

Next, the CPU 310 repeats the above processes (at steps S4 to S10).

At step S4, there are various methods for selecting a start time variable to change. In this example, the variable value change portion 332 changes the last variable of the last restriction violating condition. In other words, the variable value change portion 332 changes the variable $x_{122}$ (see FIG. 6B (2)). In this process, when the start time is changed (namely, the determined result at step S5 is YES), a restriction violating condition is satisfied. Thus, the restriction violating condition generation portion 334 generates a new restriction violating condition which is underlined in FIG. 6B (2) (at step S8).

Next, the variable value change portion 332 changes the value of the variable $x_{311}$ (see FIG. 6B (3)). In this case, when the start time $x_{311}$ is changed (namely, the determined result at step S5 is YES), the restriction violating condition is satisfied. Thus, the restriction violating condition generation portion 334 generates a new restriction violating condition which is underlined in FIG. 6B (3) (at step S8).

Next, the variable value change portion 332 changes the value of the variable $x_{111}$. When $x_{111}=2$, no restriction violating condition is satisfied (namely, the determined result at step S5 is NO) (see FIG. 6B (4)). Since there is a procedure whose start time has not been designated (namely, the determined result at step S6 is YES), the CPU 310 activates the variable value designation portion 333. Thus, the variable value designation portion 333 executes the start time designation process (at step S7).

In the start time designation process (at step S7), the variable value designation portion 333 designates the value of $x_{311}$ of the restriction violating condition generated in FIG. 6B (2). The value of the variable $x_{311}$ which does not satisfy any of the restriction violating conditions is zero (namely, $x_{311}=0$) (see FIG. 6B (5)). Likewise, the variable value designation portion 333 designates the value of the variable $x_{122}$. Thus, $x_{122}=8$ is obtained (see FIG. 6B (6)).

Next, the variable value designation portion 333 designates the value of the variable $x_{322}$. However, any value of the variable $x_{322}$ satisfies at least one of restriction violating conditions (namely, the determined result at step S5 is NO). Thus, the restriction violating condition generation portion 334 generates a new restriction violating condition which is underlined in FIG. 6C (7) (at step S8). Then, the restriction violating condition generation portion 334 stores this restriction violating condition in the restriction violating condition storage portion 351. Thereafter, the CPU 310 returns to the start time change process S4.

Figure 8:
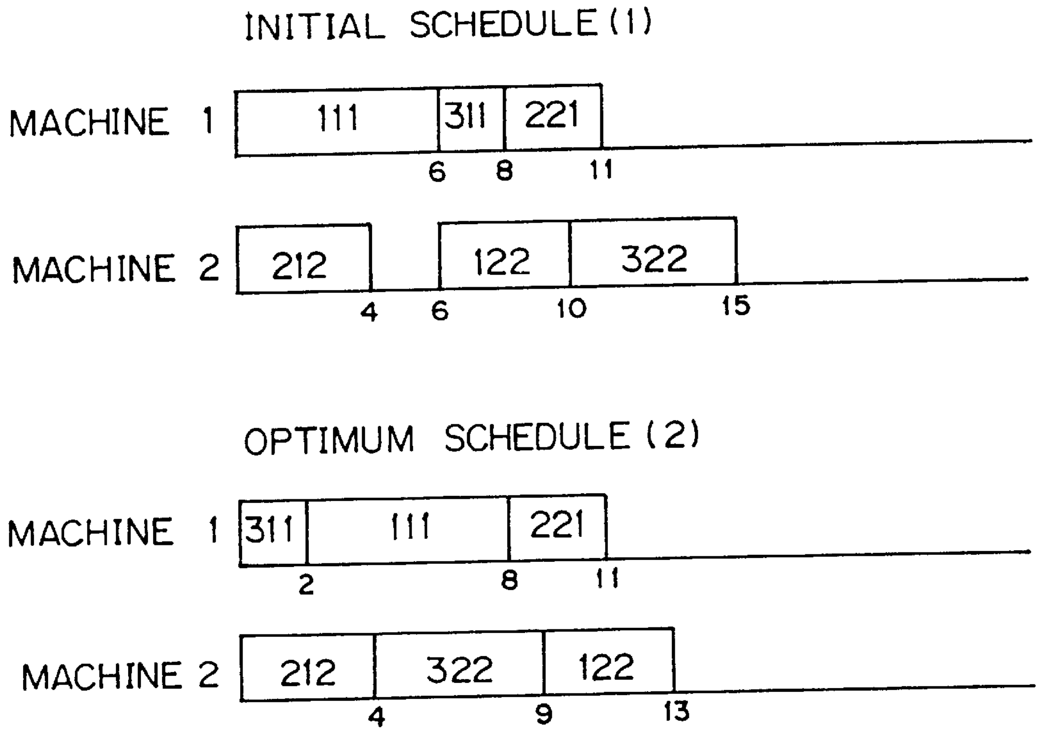
FIG. 8 is a schematic diagram showing a scheduling example (problem 1) of the embodiment.

First, the variable value change portion 332 changes the value of the variable $x_{122}$ (at step S4). When $x_{122}=9$ or 10, none of the restriction violating conditions are satisfied. Thus, the variable value change portion 332 designates $x_{122}=9$ (FIG. 7A (8)) so as to designate a start time which has not been already designated (at step S7). Thereby, $x_{221}=8$, $x_{212}=0$, and $x_{322}=4$ are obtained. With the above processes, since all the start times of all the procedures have been designated (namely, the determined result at step S6 is NO), the scheduling is successful (see FIG. 7A (9)). FIG. 8 (2) shows the obtained schedule where E=13.

To obtain an optimum schedule, the variable value designation portion 333 designates E=12 and executes the process of step S3. In this process, since $x_{122}+4>E$ is obtained, the variable value change portion 332 changes the start time of the variable $x_{122}$ (at step S4). Any value of the variable satisfies at least one of the restriction violating conditions. Thus, the restriction violating condition generation portion 334 generates a new restriction violating condition which is underlined in FIG. 7A (10) at step S8. Thereafter, the restriction violating condition generation portion 334 stores this restriction violating condition in the restriction violating condition storage portion 351. Next, the CPU 310 activates the variable value change portion 332. Thus, the variable value change portion 332 executes the start time change process for the variable $x_{111}$. In this case, any value of the variable satisfies at least one of the restriction violating conditions. Thus, the restriction violating condition generation portion 334 generates a new restriction violating condition which is underlined in FIG. 7B (11) at step S8 and stores this restriction violating condition in the restriction violating condition storage portion 351. Next, the CPU 310 activates the variable value change portion 332. The variable value change portion 332 executes the start time change process for the variable $x_{212}$ (at step S4). In this case, any value of the variable satisfies at least one of the restriction violating conditions. Thus, the restriction violating condition generation portion 334 generates a new restriction violating condition which is underlined in FIG. 7B (12) at step 8.

Thus, there is no variable on the left hand side of this restriction violating condition (namely, the determined result at step S9 is NO). Therefore, the scheduling is unsuccessful. As a result, the preceding schedule (FIG. 8 ②) becomes an optimum schedule. As a result, the total process time period is 13.

As described above, the value of a variable which does not satisfy any restriction violating condition can be designated. When this value cannot be designated, a new restriction violating condition is generated. By adding this condition, the variable value set process is repeated. Thus, a schedule which satisfies any restriction condition can be obtained. In addition, for a schedule which has been obtained, by repeating the process with stricter end times, an optimum schedule can be obtained.

In the above-described problem [problem 1], for simplicity, a minimum number of jobs and procedures was used.

Next, with reference to FIGS. 9A to 13C, a problem with an intermediate scale will be described. This problem is the same as that described in "Job Shop Scheduling Problem, Integer Programming Method and Optimum Combination", published by Nihon Kagaku Rengo, 1982, pp 289. This problem is referred to as the problem 2. Likewise, in the problem 2, by using restriction violating conditions, an optimum schedule is obtained. In the following description, variable $x_{ijk}$ represents the start time of procedure j (processed by machine k) of job i; variable $l_i$ represents the process time period of procedure i.

In the problem 2, an optimum schedule which minimizes the total process time period with respect to four jobs, three machines, and three procedures should be obtained. As shown in FIG. 9A, machines used for each procedure of each job and their process time periods are given as conditions. As in the above-described problem 1, the same machine cannot execute two or more procedures at the same time.

First, the initial restriction violating condition set portion 331 obtains initial restriction violating conditions according to the above-mentioned conditions (at step S1) and stores them in the restriction violating condition storage portion 351 (see FIG. 9B).

Figure 14:
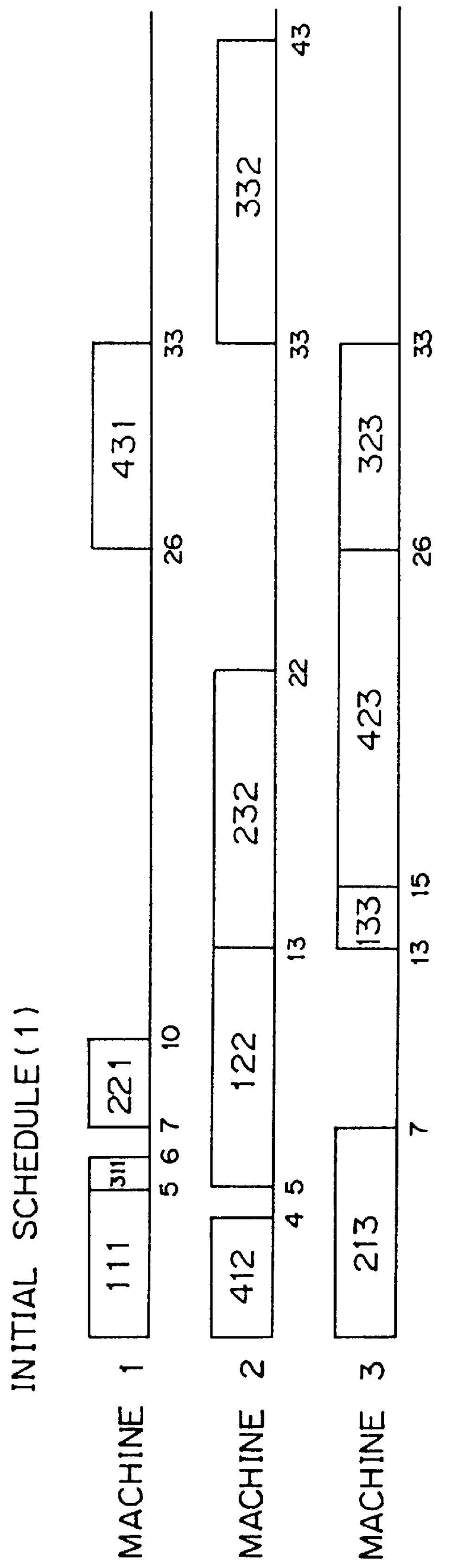
FIG. 14 is a schematic diagram showing scheduling example No. 1 of a job shop scheduling process with respect to four jobs and three machines.

Next, the CPU 310 generates an initial schedule which satisfies the above conditions (at step S2). According to the initial schedule, the CPU 310 starts the scheduling process (using the initial schedule shown in FIG. 14). On the initial schedule, since the end time E=43, the CPU 310 starts the process with a stricter end time E=42.

The restriction violating condition generation portion 334 searches for a restriction violating condition which is satisfied (at step S3). The CPU 310 activates the variable value change portion 332. Thus, the variable value change portion 332 executes the start time change process for a variable contained in the restriction violating condition (at step S4) (see FIG. 10A (1)). However, since a value of the variable which does not satisfy any of the restriction violating conditions is not possible, the CPU 310 activates the restriction violating condition generation portion 334 (at step S8). Thus, the restriction violating condition generation portion 334 generates the condition which is underlined in FIG. 10A (1) and stores the condition in the restriction violating condition storage portion 351.

Figure 15:
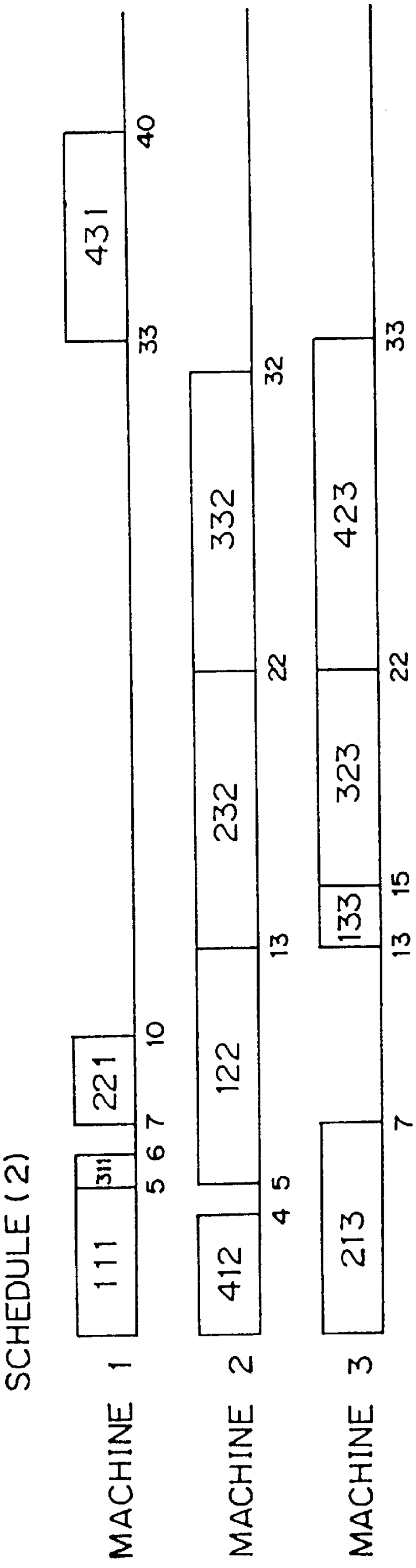
FIG. 15 is a schematic diagram showing scheduling example No. 2 of the job shop scheduling process of FIG. 14.

Next, the CPU 310 activates the variable value designation portion 333. Thus, the variable value designation portion 333 designates value for a variable whose start time has not been designated (at step S7) (see FIG. 10B (2) to FIG. 10C (6)). At this point, if a value of the variable which does not satisfy any of the restriction violating conditions is not present, the restriction violating condition generation portion 334 generates a new restriction violating condition (at step S8). Thereafter, the restriction violating condition generation portion 334 stores this condition in the restriction violating condition storage portion 351 (at step S10). In this process, the variable value designation portion 333 can designate a start time which does not satisfy any of the restriction violating conditions and obtain a new schedule shown in FIG. 15.

Since the end time E of this schedule is 40 (E=40), the CPU 310 repeats the scheduling process with E=39 (see FIG. 11A (7) to FIG. 11D (14)). First, the initial restriction violating condition set portion 331 searches for a restriction violating condition which is satisfied (at step S3). Then, the variable value change portion 332 changes the value of the variable contained in the restriction violating condition (at step S4). Thereafter, the variable value designation portion 333 designates the value of another variable (at step S7). When any restriction violating condition is satisfied, the restriction violating condition generation portion 334 generates a new restriction violating condition (at step S8). Thereafter, the CPU 310 repeats the scheduling process at step S4.

Figure 16:
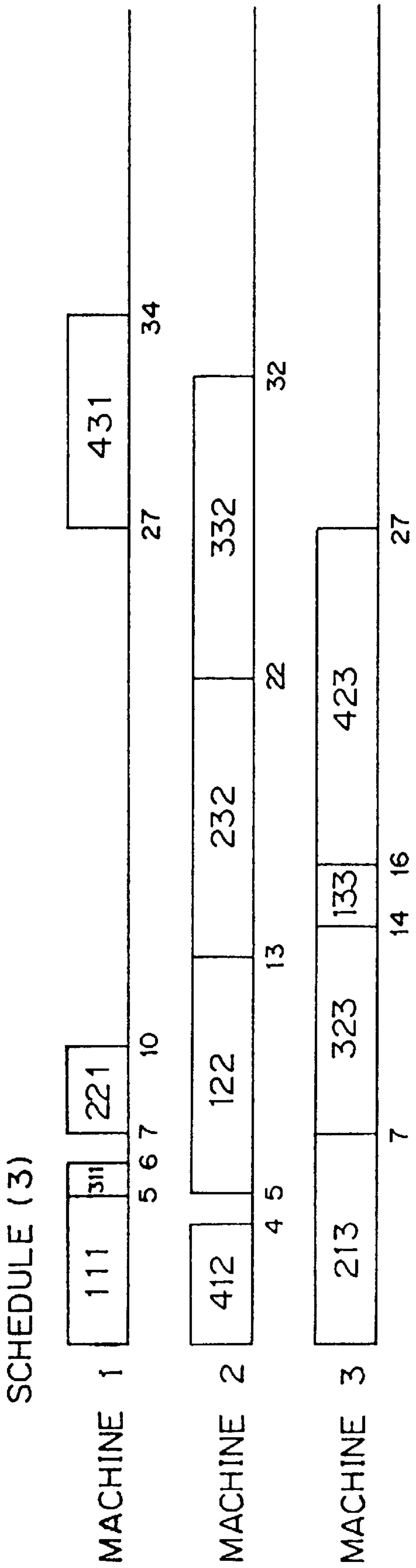
FIG. 16 is a schematic diagram showing scheduling example No. 3 of the job shop scheduling process of FIG. 14.

With the above processes (see FIG. 11A (7) to FIG. 11D (14)), the variable value designation portion 333 can designate the start times of all the procedures and generates a new schedule shown in FIG. 16.

Figure 17:
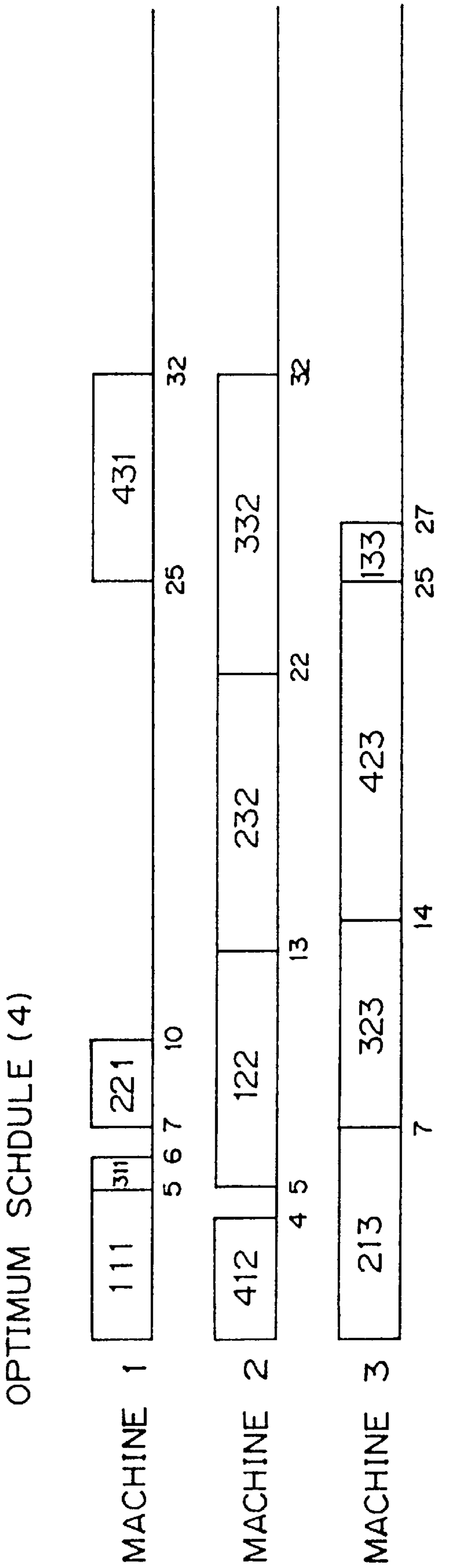
FIG. 17 is a schematic diagram showing scheduling example No. 4 of the job shop scheduling process of FIG. 14.

The CPU 310 designates E=33 which is stricter than E=34 and repeats the scheduling process (see FIG. 12A (15) to FIG. 12B (18)). Thus, the CPU 310 obtains a new schedule shown in FIG. 17.

The CPU 310 designates E=31 which is stricter than E=32 and repeats the scheduling process (see FIG. 12B (19) to (21) and FIG. 13A (22) to FIG. 13C (29)). When a new restriction violating condition is generated, the left hand side thereof may not have a variable (32>E of FIG. 13A (24) to FIG. 13C (29)). Thus, since the determined result at step S9 is NO, the scheduling becomes unsuccessful.

With the above processes, the schedule obtained just before the scheduling was unsuccessful (namely, the schedule shown in FIG. 17) becomes the optimum schedule. Thus, the total process time period is 32.

fixed phrase

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

Since a restriction violating condition is generated in which a variable corresponding to the start time of a procedure is changed to an value, the number of procedures whose start times should be changed can be limited. In addition, the range of the start times of these procedures can be also narrowed. Moreover, by ANDing two or more inequalities, the sufficient condition for a restriction violation due to the relation of two or more jobs can be expressed. As a result, worthless searches can be omitted and the scheduling can be effectively executed. It should be noted that the effect of the present invention can be obtained when restriction satisfying condition are used.

What is claimed is:

1. A computer-implemented job shop scheduling system for designating start times of a plurality of procedures processed by a plurality of resource devices, having restriction conditions with respect to available start times, end times, a sequence of said procedures, and a prohibition of simultaneous executions of multiple said procedures, said system comprising:

initial restriction violating condition set means for initially setting restriction violating conditions which satisfy a sufficient condition for a violation of said restriction conditions;

start time change means for changing a first start time of one of said plurality of procedures when said restriction violating condition is set by said initial restriction violating condition set means, to not satisfy said restriction violating conditions, thereby optimizing a total process time;

start time designation means for designating a second start time of one of said plurality of procedures when said restriction violating condition is set by said initial restriction violating condition set means, to not satisfy said restriction violating conditions, thereby optimizing a total process time;

restriction violating condition generation means for assigning a start time of a procedure which satisfies at least one of said restriction violating conditions to a corresponding variable of one of the restriction violating conditions which is satisfied and for ANDing said restriction violating conditions with said one restriction violating condition having said assigned start time to generate a new restriction violating condition and for narrowing a search space by substituting a real numeric number of a start time into a variable corresponding to a start time of a restriction violating condition and prohibiting a sub-schedule based on a partially undefined schedule which satisfies said restriction violating condition; and restriction violating condition storage means for storing said restriction violating conditions set by said initial restriction violating condition set means and generated by said restriction violating condition generation means.

2. The computer-implemented job shop scheduling system as set forth in claim 1, wherein an available start time and end time of each of said plurality of procedures included in said restriction violating conditions are variables making a restriction violating condition still valid even after the corresponding available start time or available end time is changed.

3. The computer-implemented job shop scheduling system as set forth in claim 2, further including a device to update the value of said variables representing the available start time or the end time to a stricter value whenever one schedule is obtained and to generate a restriction validating condition which includes a variable corresponding to the available start time or the available end time as the only variable when a schedule cannot be successfully obtained.

4. The computer-implemented job shop scheduling system as set forth in claim 1, further comprising:

a device to update the value of a variable representing an available start time or end time to a stricter value whenever one schedule is obtained and to generate a restriction validating condition which includes a variable corresponding to the available start time or the available end time as the only variable when a schedule cannot be successfully obtained;

resource allocation means for allocating said resource devices;

processing time allocation means for allocating processing time;

procedure sequence allocation means for allocating a sequence of a procedure by considering said available start times, said end times, a restriction for a procedure sequence to be selected from a lowest order to higher orders, said simultaneous execution prohibition of said multiple procedures; and job allocation means for allocating a job, whereby said initial restriction violating condition set means, said start time change means, said start time designation means, said restriction violating condition generation means, and said restriction violating condition storage means are controlled by said resource allocation means, said processing time allocation means, said procedure sequence allocation means and said job allocation means.

5. The computer-implemented job shop scheduling system as set forth in claim 1 wherein said available start time is defined as a restriction violation condition defined by applying a negative condition to a condition for a first procedure available start time and a next available start time.

6. The computer-implemented job shop scheduling system as set forth in claim 1 wherein said end time is defined as a restriction violation condition defined by applying a negative condition to an end time condition defined with an end time variable number resulted from all necessary procedure times.

7. The computer-implemented job shop scheduling system as set forth in claim 1 wherein said procedure sequence is defined as a restriction violation condition defined by applying a negative condition to a condition defined by adding corresponding process time and corresponding start time.

8. The computer-implemented job shop scheduling system as set forth in claim 1 wherein said simultaneous execution prohibition for multiple procedures is defined by a restriction condition showing an impossibility for processing multiple procedures with a same machine by applying a negative condition to conditions for procedures executed by said same machine.

9. A computer-implemented job shop scheduling system for designating start times of a plurality of procedures processed by a plurality of resource devices, having restriction conditions with respect to available start times, end times, a sequence of said procedures, and a prohibition of simultaneous executions of multiple said procedures, said system comprising:

initial restriction satisfying condition set means for initially setting restriction satisfying conditions which satisfy a necessary condition for a satisfaction of said restriction conditions;

start time change means for changing a first start time of one of said plurality of procedures when said restriction satisfying condition is set by said initial restriction satisfying condition set means, to satisfy said restriction satisfying conditions, thereby optimizing a total process time;

start time designation means for designating a second start time of one of said plurality of procedures when said restriction satisfying condition is set by said initial restriction satisfying condition set means, to satisfy said restriction satisfying conditions, thereby optimizing a total process time;

restriction satisfying condition generation means for assigning a start time of a procedure which does not satisfy at least one of said restriction satisfying conditions to a corresponding variable of one of the restriction satisfying conditions which is not satisfied and for ANDing said restriction satisfying conditions with said one restriction satisfying condition having said assigned start time to generate a new restriction satisfying condition; and restriction satisfying condition storage means for storing said restriction satisfying conditions set by said initial restriction satisfying condition set means and generated by said restriction satisfying condition generation means.

10. The computer-implemented job shop scheduling system as set forth in claim 9, wherein an available start time and end time of each of said plurality of procedures included in said restriction satisfying conditions are variables making a restriction satisfying condition still valid even after the corresponding available start time or available end time is changed.

11. The computer-implemented job shop scheduling system as set forth in claim 10, further including a device to update the value of said variables representing the available start time or the end time to a stricter value whenever one schedule is obtained and to generate a restriction satisfying condition which includes a variable corresponding to the available start time or the available end time as the only variable when a schedule cannot be successfully obtained, thereby obtaining an optimum schedule with a minimum total process time period.

12. The computer-implemented job shop scheduling system as set forth in claim 9, further comprising:

a device to update the value of a variable representing an available start time or end time to a stricter value whenever one schedule is obtained and to generate a restriction satisfying condition which includes a variable corresponding to the available start time or the available end time as the only variable when a schedule cannot be successfully obtained, thereby obtaining an optimum schedule with a minimum total process time period;

resource allocation means for allocating said resource devices;

processing time allocation means for allocating processing time;

procedure sequence allocation means for allocating a sequence of a procedure by considering said available start times, said end times, a restriction for a procedure sequence to be selected from a lowest order to higher orders, said simultaneous execution prohibition of said multiple procedures; and job allocation means for allocating a job, whereby said initial restriction violating condition set means, said start time change means, said start time designation means, said restriction violating condition generation means, and said restriction violating condition storage means are controlled by said resource allocation means, said processing time allocation means, said procedure sequence allocation means and said job allocation means.

13. A computer-implemented job shop scheduling method for designating start times of a plurality of procedures processed by a plurality of resource devices, having restriction conditions with respect to available start times, end times, a sequence of said procedures, and a prohibition of simultaneous executions of multiple said procedures, said method comprising the steps of:

initially setting restriction violating conditions which satisfy a sufficient condition for a violation of said restriction conditions;

changing a first start time of one of said plurality of procedures when said restriction violating condition is set, to not satisfy said restriction violating conditions, thereby optimizing a total process time;

designating a second start time of one of said plurality of procedures when said restriction violating condition is set, to not satisfy said restriction violating conditions, thereby optimizing a total process time;

assigning a start time of a procedure which satisfies at least one of said restriction violating conditions to a corresponding variable of one of the restriction violating conditions which is satisfied and ANDing said restriction violating conditions with said one restriction violating condition having said assigned start time to generate a new restriction violating condition and for narrowing a search space by substituting a real numeric number of a start time into a variable corresponding to a start time of a restriction violating condition and prohibiting a sub-schedule based on a partially undefined schedule which satisfies said restriction violating condition; and storing said restriction violating conditions.

14. A computer-implemented job shop scheduling method for designating start times of a plurality of procedures processed by a plurality of resource devices, having restriction conditions with respect to available start times, end times, a sequence of said procedures, and a prohibition of simultaneous executions of multiple said procedures, said method comprising the steps of:

initially setting restriction satisfying conditions which satisfy a necessary condition for a satisfaction of said restriction conditions;

changing a first start time of one of said plurality of procedures when said restriction satisfying condition is set, to satisfy said restriction satisfying conditions, thereby optimizing a total process time;

designating a second start time of one of said plurality of procedures when said restriction satisfying condition is set, to satisfy said restriction satisfying conditions, thereby optimizing a total process time;

assigning a start time of a procedure which does not satisfy at least one of said restriction satisfying conditions to a corresponding variable of one of the restriction violating conditions which is not satisfied and ANDing said restriction satisfying conditions with said one restriction violating condition having said assigned start time to generate a new restriction satisfying condition; and storing said restriction satisfying conditions.

15. A computer implemented scheduling method for designating a procedure start time, comprising:

assigning a start time for a procedure which satisfies a first restriction violating condition; and ANDing the first and another restriction violating condition generating a new restriction violating condition, thereby narrowing a search space by substituting a real number start time for a variable and prohibiting a subschedule based on a partially undefined schedule.

16. A computer implemented scheduling method for designating a procedure start time, comprising:

assigning a start time for a procedure which does not satisfy a first restriction satisfying condition; and ANDing the first and another restriction satisfying condition generating a new restriction satisfying condition.

* * * * *

UNITED STATES PATENT AND TRADEMARK OFFICE
CERTIFICATE OF CORRECTION

PATENT NO : 6,083,539
DATED : July 4, 2000
INVENTOR(S): Takao Yamada; Yoshio Iljima It is certified that error appears in the above-identified patent and that said Letters Patent are hereby corrected as shown below:

Cover Page under Assignee, delete "Ebisu" and insert --Seika--.

Signed and Sealed this

First Day of May, 2001

*Attest:*

Nicholas P. Godici

NICHOLAS P. GODICI

*Attesting Officer* *Acting Director of the United States Patent and Trademark Office*